United States Patent
Kittaka et al.

(10) Patent No.: US 10,890,233 B2
(45) Date of Patent: Jan. 12, 2021

(54) VEHICLE POWER UNIT

(71) Applicant: HONDA MOTOR CO., LTD., Tokyo (JP)

(72) Inventors: Eiji Kittaka, Wako (JP); Takashi Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 16/371,415

(22) Filed: Apr. 1, 2019

(65) Prior Publication Data
US 2019/0309827 A1 Oct. 10, 2019

(30) Foreign Application Priority Data
Apr. 5, 2018 (JP) .................................. 2018-072918

(51) Int. Cl.
| | | |
|---|---|---|
| *F16H 57/02* | (2012.01) | |
| *F16H 63/18* | (2006.01) | |
| *F16H 63/30* | (2006.01) | |
| *F16H 3/091* | (2006.01) | |

(52) U.S. Cl.
CPC ............. *F16H 3/091* (2013.01); *F16H 57/02* (2013.01); *F16H 63/18* (2013.01); *F16H 63/304* (2013.01); *F16H 2057/0203* (2013.01); *F16H 2063/3056* (2013.01)

(58) Field of Classification Search
CPC .......... F16H 3/091; F16H 57/02; F16H 63/18; F16H 63/304; F16H 2057/0203
USPC ............................................. 74/337.5, 606 R
See application file for complete search history.

(56) References Cited

U.S. PATENT DOCUMENTS

| | | | | |
|---|---|---|---|---|
| 4,549,510 | A * | 10/1985 | Miyakoshi | .............. F01L 1/024 123/432 |
| 7,121,163 | B2 * | 10/2006 | Ito | .......................... F01M 11/02 74/606 R |
| 7,913,817 | B2 * | 3/2011 | Fujimoto | ................ F02B 61/02 184/6.28 |
| 8,925,500 | B2 | 1/2015 | Kisaichi et al. | |

FOREIGN PATENT DOCUMENTS

| | | |
|---|---|---|
| JP | 10-038037 A | 2/1998 |
| JP | 2008-115883 A | 5/2008 |
| JP | 2011-073591 A | 4/2011 |

(Continued)

OTHER PUBLICATIONS

Office Action dated Aug. 13, 2019 issued in the corresponding Japanese patent application No. 2018-072918.

*Primary Examiner* — Ha Dinh Ho
(74) *Attorney, Agent, or Firm* — Carrier Blackman & Associates, P.C.; Joseph P. Carrier; William D. Blackman

(57) ABSTRACT

A vehicle power unit is disclosed which prevents a transmission apparatus from becoming large in size and promotes reduction in size by reducing the number of parts. A transmission shift drum has a driven gear mounted on a shift drum rotary shaft portion on one end of the shift drum. An extended support wall is formed to extend to outside in a vehicle width direction in parallel with a first case side wall of a crankcase. The case side wall supports the first drum rotary shaft portion on which the driven gear is mounted. The extended support wall and the first case side wall support thereon gears of a reduction gear train between a drive gear of a shift motor mounted on the extended support wall and the driven gear.

10 Claims, 10 Drawing Sheets

(56) References Cited

FOREIGN PATENT DOCUMENTS

| | | | |
|---|---|---|---|
| JP | 2014-070649 | A | 4/2014 |
| JP | 2014-125930 | A | 7/2014 |
| JP | 2017-180694 | A | 10/2017 |

\* cited by examiner

VEHICLE POWER UNIT

TECHNICAL FIELD

The present invention relates to a vehicle power unit mounted on a small-sized vehicle.

BACKGROUND ART

Patent Document 1, for example, discloses an example of a vehicle power unit that is mounted on a small-sized vehicle longitudinally thereof. The vehicle power unit has a crankshaft oriented in the vehicle fore-aft direction and includes an internal combustion engine and a transmission apparatus integrally housed in a crankcase. In this vehicle power unit, the transmission apparatus includes a transmission including gear pairs, each having a specific gear ratio for power transmission, and a speed change drive mechanism that performs a gearshift operation by changing the gear pairs for power transmission of the transmission through movement of a shift fork that is guided by a shift drum rotated by drive of a shift motor.

PRIOR ART DOCUMENT

Patent Document

[Patent Document 1]
JP 2014-125930 A

In the vehicle power unit disclosed in Patent Document 1, crankcase side walls are provided at front and rear of the crankcase to rotatably support the crankshaft oriented in the vehicle fore-aft direction. The crankcase side walls also rotatably support a main shaft and a counter shaft of the transmission oriented in the vehicle fore-aft direction, as well as the shift drum of the speed change drive mechanism.

A shift spindle extends across the rear-side crankcase side wall and across a case cover (clutch cover) that covers the rear-side crankcase side wall from the rear. The shift motor is mounted on the case cover from the rear.

A gear fitted along the case cover on a rear portion of the shift spindle is operatively associated with a drive gear of the shift motor via a reduction gear mechanism.

Meanwhile, a master arm provided along the rear-side case side wall at a front end portion of the shift spindle rocks to cause the shift drum to rotate through a predetermined angle via an intermittent feed mechanism.

SUMMARY OF THE INVENTION

Underlying Problem to be Solved by the Invention

The speed change drive mechanism disclosed in Patent Document 1 includes, as described above, the reduction gear mechanism disposed at the rear portion of the shift spindle and the intermittent feed mechanism together with the master arm disposed at the front portion of the shift spindle, thus requiring a space for arranging each of the reduction gear mechanism and the intermittent feed mechanism at front and rear of the shift spindle. This enlarges the transmission apparatus in the vehicle fore-aft direction, resulting in an increase in size of the vehicle power unit. Furthermore, the speed change drive mechanism has a large number of parts and thus a complicated structure that result in increased cost.

An additional need exists for a quick and smooth gearshift through use of an electric motor.

The present invention has been made in view of the foregoing and it is an object of the present invention to provide at reduced cost a vehicle power unit that can prevent the transmission apparatus from becoming large in size and can promote reduction in size by reducing the number of parts used in a speed change drive mechanism and by simplifying structure of the speed change drive mechanism and that can perform a quick and smooth gearshift operation through use of an electric motor.

Means to Solve the Problem

To achieve the foregoing object, the present invention provides a vehicle power unit mounted on a small-sized vehicle, including an internal combustion engine with a crankshaft oriented in a vehicle fore-aft direction, and a transmission apparatus, which are integrally housed in a crankcase, wherein the transmission apparatus comprises: a transmission including gear pairs having specific gear ratios for power transmission, respectively, and a speed change drive mechanism for performing a gearshift operation by changing the gear pairs for power transmission by the transmission through movement of a shift fork guided by a shift drum rotatable by means of a shift motor; and wherein the shift drum extends in the vehicle fore-aft direction and includes first and second drum rotary shaft portions provided at one and other ends of the shift drum; first and second case side walls are provided at one and other sides of the crankcase to rotatably support the first and second drum rotary shaft portions, respectively; a driven gear is mounted on the first drum rotary shaft portion on the one end of the shift drum; an extended support wall is formed so as to extend outward in a vehicle width direction from, and in parallel with the first case side wall of the crankcase; the shift motor is supported on the extended support wall and has a drive gear rotatably supported by the extended support wall; and gears of a reduction gear train are provided between the drive gear and the driven gear and have a plurality of reduction speeds for power transmission from the drive gear to the driven gear, the gears of the reduction gear train being arranged on the extended support wall and the first case side wall.

With the foregoing arrangement, the transmission apparatus includes the transmission and the speed change drive mechanism, the driven gear is disposed on the first drum rotary shaft portion of the shift drum of the speed change drive mechanism, the extended support wall is provided to extend to outside in the vehicle width direction in parallel with the first case side wall of the crankcase, the first case side wall rotatably supporting the first drum rotary shaft portion on which the driven gear is mounted, the gears of the reduction gear train, having a plurality of reduction speeds for power transmission from the drive gear of the shift motor supported on the extended support wall to the driven gear, are arranged by being supported on the extended support wall and the first case side wall. The speed change drive mechanism is thus integrated on the first case side wall and the extended support wall, so that the transmission apparatus can be prevented from becoming large in size and reduction in size of the vehicle power unit can be promoted.

Additionally, drive of the shift motor is transmitted for rotation of the shift drum via only the reduction gear train. This configuration eliminates the need for an intermittent feed mechanism, so that a simplified structure can be achieved by reducing the number of parts used in the speed change drive mechanism. Thus, the transmission apparatus can be prevented from becoming large in size and reduction in size and cost of the vehicle power unit can be further promoted. Furthermore, a quick and smooth gearshift operation can be performed through use of an electric motor.

The omission of the intermittent feed mechanism leads to gearshift noise not being generated by the intermittent feed mechanism, thus eliminating the need for a sound isolation structure.

In a preferred embodiment of the invention, the shift motor is a direct current motor having a maximum value of pulsating cogging torque of 0.04 to 0.07 Nm; and the reduction gear train has a reduction gear ratio from 23 to 45.

With the foregoing configuration, the cogging torque has a maximum value of 0.04 Nm or more and the gear train for transmitting power to the shift motor has a plurality of reduction speeds at reduction gear ratios of 23 to 45. An overshoot can thus be reduced through an effective use of the cogging torque for braking the shift motor. The shift drum can easily be brought to a stop at a required angular position even with the intermittent feed mechanism omitted. The number of parts used in the speed change drive mechanism can thus be reduced and the structure of the speed change drive mechanism can be simplified, so that the transmission apparatus can be prevented from becoming large and the vehicle power unit can be reduced in size and cost.

When the reduction gear ratio of the reduction gear train is 23 or higher, the shift drum can be brought to a stop at a required angular position even with the stopper mechanism omitted. Then, the transmission apparatus is reduced in size for the omitted stopper mechanism and the vehicle power unit can thus be further reduced in size.

When the reduction gear ratio of the reduction gear train exceeds 45, a longer time is required for the speed change gears to move. A longer time is thus required for changing the shift speeds, so that engagement of a dog clutch is not smooth.

This requires an increase in size and power output of the shift motor.

In a preferred embodiment of the invention, the driven gear on the one end of the shift drum is positioned on an outer side of the first case side wall; and the shift motor is mounted on the extended support wall in such a manner that the drive gear is positioned on a side of the extended support wall, which is the same side as the outer side of the first case side wall.

With the foregoing configuration, the shift motor is disposed on the extended support wall such that the drive gear of the shift motor protrudes in the direction identical to the direction in which the first drum rotary shaft portion supporting the driven gear is disposed. The shift motor has a motor main body disposed on the same side in the fore-aft direction as the side on which the shift drum is disposed with respect to the extended support wall and the first case side wall. Thus, the motor main body does not protrude outward in the vehicle fore-aft direction and is compactly disposed.

In a preferred embodiment of the invention, with respect to the fore-aft direction, the extended support wall is displaced toward the outer side on which the driven gear is positioned relative to the first case side wall; the reduction gear train has an intermediate gear shaft oriented in the fore-aft direction, the intermediate gear shaft being disposed to extend from the first case side wall to a position beyond the extended support wall; the reduction gear train includes a drive-side reduction gear train provided between the drive gear and an enlarged-diameter reduction gear fitted on the intermediate gear shaft adjacent to the extended support wall and the reduction gear train includes a driven-side reduction gear train provided between the driven gear and a reduced-diameter reduction gear fitted on the intermediate gear shaft adjacent to the first case side wall.

With the foregoing configuration, the drive-side reduction gear train of the reduction gear train is formed between the drive gear and the enlarged-diameter reduction gear fitted on the intermediate gear shaft adjacent to the extended support wall, and the driven-side reduction gear train of the reduction gear train is formed between the driven gear and the reduced-diameter reduction gear fitted on the intermediate gear shaft adjacent to the first case side wall. Thus, the reduction gear train is divided into the drive-side reduction gear train on the extended support wall and the driven-side reduction gear train on the first case side wall. The shift motor mounted on the extended support wall has a greater degree of freedom in disposition, so that the shift motor can be disposed at a position at which the shift motor does not interfere with any other member and does not protrude.

Additionally, the enlarged-diameter gear of the intermediate gear shaft is disposed on the side closer to the drive-side reduction gear train displaced in the fore-aft direction and the reduced-diameter gear of the intermediate gear shaft is incorporated in the driven-side reduction gear train. This configuration allows the intermediate gear shaft to be disposed close to the shift drum, so that the reduction gear train can be integrated and disposed compactly.

In a further preferred embodiment of the invention, the drive-side reduction gear train has reduction speeds greater in number than the driven-side reduction gear train.

With the foregoing configuration, because the drive-side reduction gear train has the reduction speeds greater in number than the driven-side reduction gear train, the drive-side reduction gear train has a greater degree of freedom in disposition. This leads to a greater degree of freedom in disposing the shift motor, so that the shift motor can be spaced away from the crankcase to thereby form a clearance around the shift motor, which leads to improved cooling performance of the shift motor.

In a still further preferred embodiment of the invention, the shift motor is disposed such that it has a motor main body oriented in a vehicle frontward direction and the drive gear thereof is positioned rearward of the motor main body.

With the foregoing configuration, the shift motor is provided in an arrangement such that the drive gear protrudes rearward and the motor main body is oriented in a vehicle frontward direction. The shift motor can thus be effectively cooled by air flow.

In a preferred embodiment of the invention, the intermediate gear shaft is a manual gearshift operation shaft.

With the foregoing configuration, because of the intermediate gear shaft being used as the manual gearshift operation shaft, the manual gearshift operation mechanism can be readily added.

In a preferred embodiment of the invention, the intermediate gear shaft has an end portion on a side adjacent to the extended support wall, the end portion being a gearshift acting knob to which a manual gearshift operating force is applied.

With the foregoing configuration, the end portion of the intermediate gear shaft on the side adjacent to the extended support wall serves as the gearshift acting knob to which manual gearshift operating force is applied. The gearshift acting knob is thus disposed at a position remote from the crankcase in the fore-aft direction and is readily noticeable for improved operability.

In a preferred embodiment of the invention, the extended support wall is an extended support wall portion formed integrally with the first case side wall and extending outward in the vehicle width direction.

With the foregoing configuration, the extended support wall assumes the extended support wall portion formed integrally with the first case side wall and extending outward in the vehicle width direction. Thus, the drive gear and the driven gear are disposed on surfaces substantially flush with each other and the speed change drive mechanism is integrated on the first case side wall. The transmission apparatus can thus be prevented from becoming large in size and reduction in size of the vehicle power unit is promoted.

In a further preferred embodiment of the invention, the reduction gear train includes gear shafts arranged in the vehicle width direction in a vertically zigzag manner.

With the foregoing configuration, the reduction gear train includes the gear shafts arranged in the left-right direction in a vertically zigzag manner. The gear shafts can thus be compactly arranged and the speed change drive mechanism can be integrated on the first case side wall, so that the transmission apparatus can be prevented from becoming large in size and reduction in size of the vehicle power unit can be promoted.

Effects of the Invention

In accordance with the present invention, the transmission apparatus includes the transmission and the speed change drive mechanism, the driven gear is disposed on the first drum rotary shaft portion on one side of the shift drum of the speed change drive mechanism, the extended support wall is disposed so as to extend to outside in the vehicle width direction in parallel with the first case side wall of the crankcase, the first case side wall rotatably supports the first drum rotary shaft portion on which the driven gear is mounted, the gears of the reduction gear train have a plurality of reduction speeds for power transmission from the drive gear of the shift motor mounted on the extended support wall to the driven gear, and the reduction gear train are arranged by being supported on the extended support wall and the first case side wall. The speed change drive mechanism is thus integrated on the first case side wall and the extended support wall, so that the transmission apparatus can be prevented from becoming large in size and reduction in size of the vehicle power unit can be promoted.

Additionally, drive of the shift motor is transmitted for rotation of the shift drum via only the reduction gear train. This configuration eliminates the need for an intermittent feed mechanism, so that a simplified structure can be achieved by reducing the number of parts used in the speed change drive mechanism. Thus, the transmission apparatus can be prevented from becoming large in size, and reduction in size and cost of the vehicle power unit can be further promoted. Furthermore, a quick and smooth gearshift operation can be performed through use of an electric motor.

The omission of the intermittent feed mechanism leads to gearshift noise being not generated by the intermittent feed mechanism, thus eliminating the need for a sound isolation structure.

MODE FOR CARRYING OUT THE INVENTION

Figure 1:
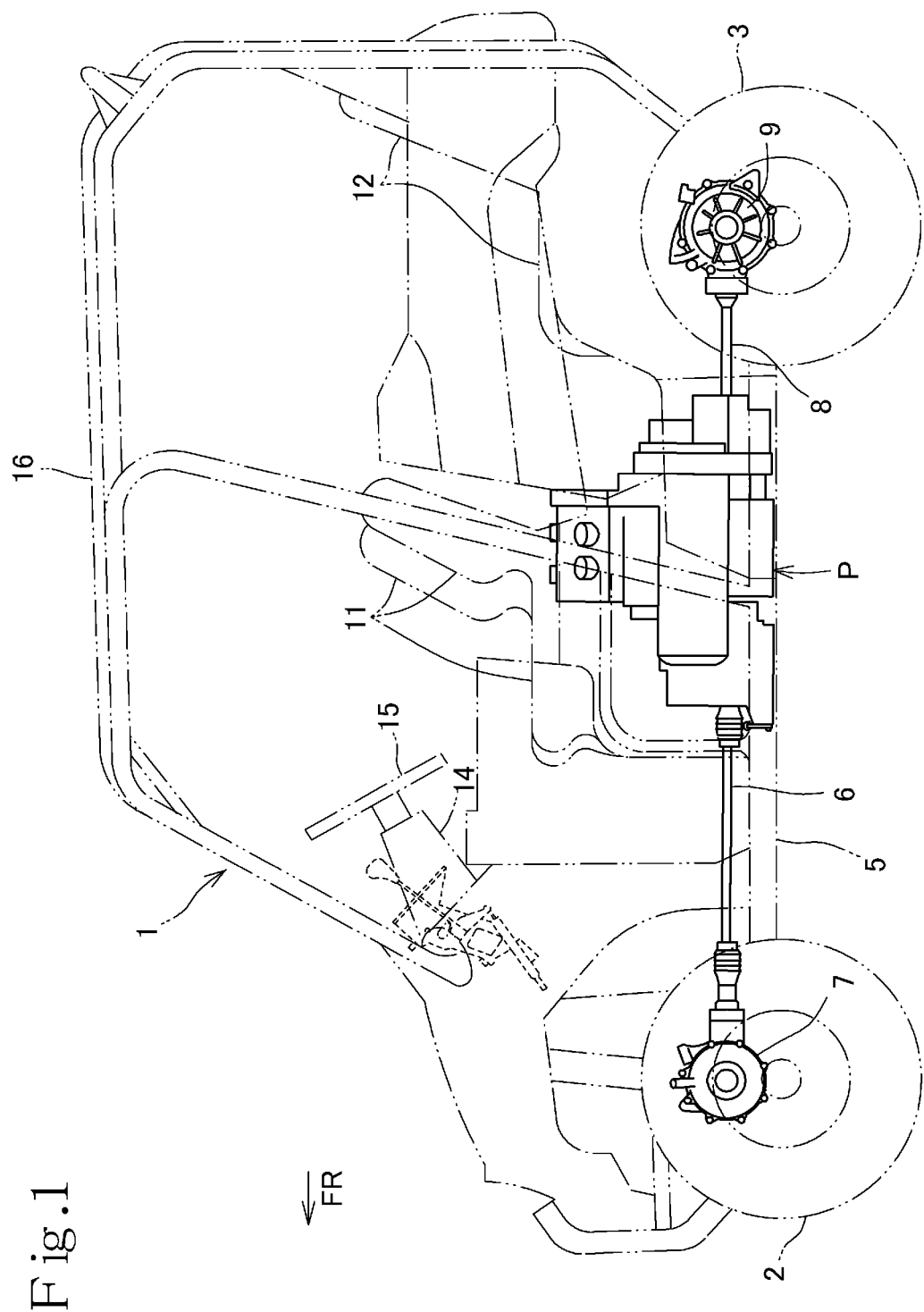
FIG. 1 is a left side view of an all-terrain vehicle on which a vehicle power unit according to an embodiment of the present invention is mounted.

A first embodiment of the present invention will be described below with reference to FIGS. 1 to 7 of the drawings.

A vehicle power unit P according to the embodiment is mounted on a five-passenger, roofed all-terrain vehicle 1 capable of four-wheel drive, as a small-sized vehicle.

Throughout the description given hereunder, expressions indicating directions including front and rear and right and left comply with common directions with reference to a straight-forward direction of the all-terrain vehicle 1 defined as being forward. In the drawings, an arrow FR indicates a frontward direction, an arrow RR indicates a rearward direction, an arrow LH indicates a leftward direction, and an arrow RH indicates a rightward direction.

Reference is made to FIG. 1. The all-terrain vehicle 1 includes respective left and right pairs of front wheels 2 and rear wheels 3, on which low-pressure balloon tires for off-road use are mounted. The front wheels 2 and the rear wheels 3 are suspended at front and rear, respectively, of a vehicle body frame 5.

Figure 2:
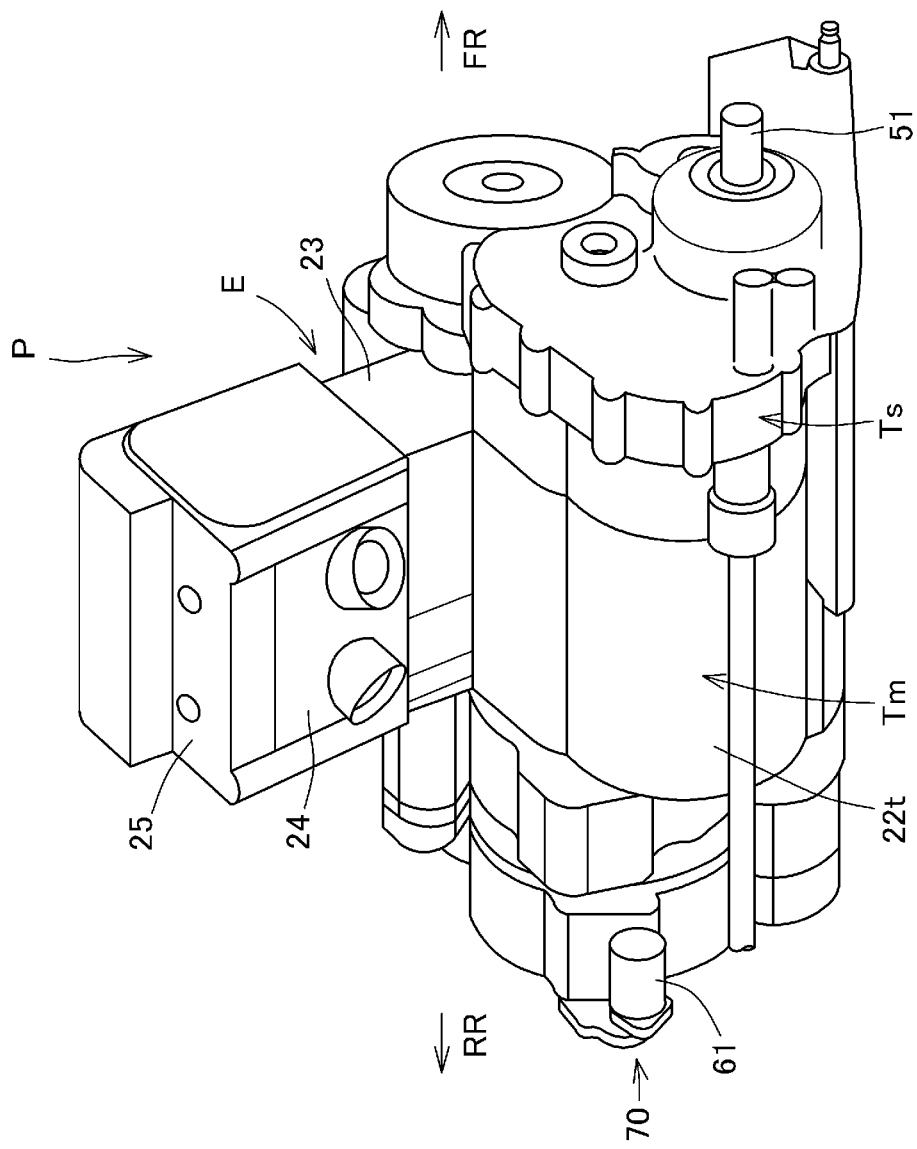
FIG. 2 is a perspective view of the vehicle power unit.

The vehicle power unit P includes an internal combustion engine E and is mounted at a central position in a fore-aft direction of the vehicle body frame 5, with a crankshaft 21 (see FIG. 3) of the engine E oriented in a vehicle fore-aft direction. As shown in FIG. 2, the vehicle power unit P has an output shaft (a transmission driven shaft) 51 protruding to the front and rear. Rotational drive power of the output shaft 51 is transmitted from a front end of the output shaft 51 to the left and right front wheels 2 via a front drive shaft 6 and a front differential device 7 and from a rear end of the output shaft 51 to the left and right rear wheels 3 via a rear drive shaft 8 and a rear differential device 9.

Front seats 11 are disposed in front of the vehicle power unit P and in juxtaposition with each other laterally. A rear seat 12 is disposed at a rear portion of the vehicle body frame 5.

A steering wheel 15 is disposed in front of the front seats 11 such that the steering wheel 15 protrudes from a steering column 14.

A roof 16 covers an area of the front seats 11 and the rear seat 12 from above.

In the vehicle power unit P mounted in the all-terrain vehicle 1, the inline two-cylinder, water-cooled, four-stroke internal combustion engine E is combined with a main transmission Tm (see FIGS. 2 and 4) and a subsidiary transmission Ts, which form a transmission apparatus T, to thereby constitute a power transmission apparatus 20.

The vehicle power unit P is mounted on the vehicle body frame 5 in a longitudinal posture having the crankshaft 21 of the engine E oriented in the vehicle fore-aft direction.

Figure 3:
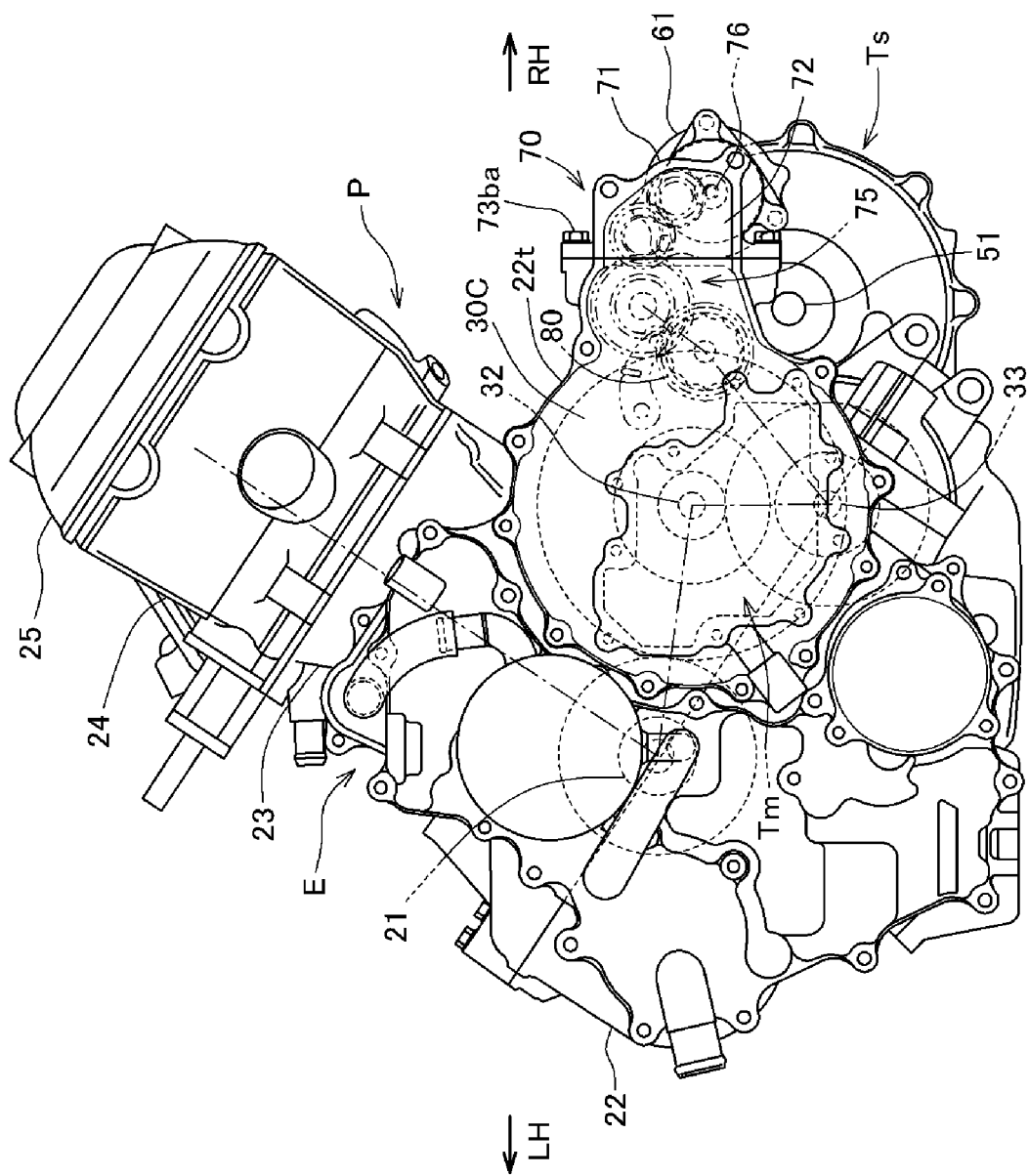
FIG. 3 is a rear view of the vehicle power unit.

Reference is made to FIGS. 2 and 3. The vehicle power unit P is disposed in a protruding condition by having a cylinder block 23, a cylinder head 24, and a cylinder head cover 25 stacked in sequence one on top of another obliquely upward toward the right on a crankcase 22, which rotatable supports the crankshaft 21 of the internal combustion engine E.

The crankcase 22 bulges to the right, as will be noted from FIG. 3, to thereby constitute a main transmission case 22t, which houses therein the main transmission Tm.

The main transmission Tm is disposed on the right of the crankshaft 21 of the engine E. The subsidiary transmission Ts is provided in a protruding manner and disposed in front of the main transmission Tm so as to substantially overlap the main transmission Tm in the vehicle fore-aft direction.

Figure 4:
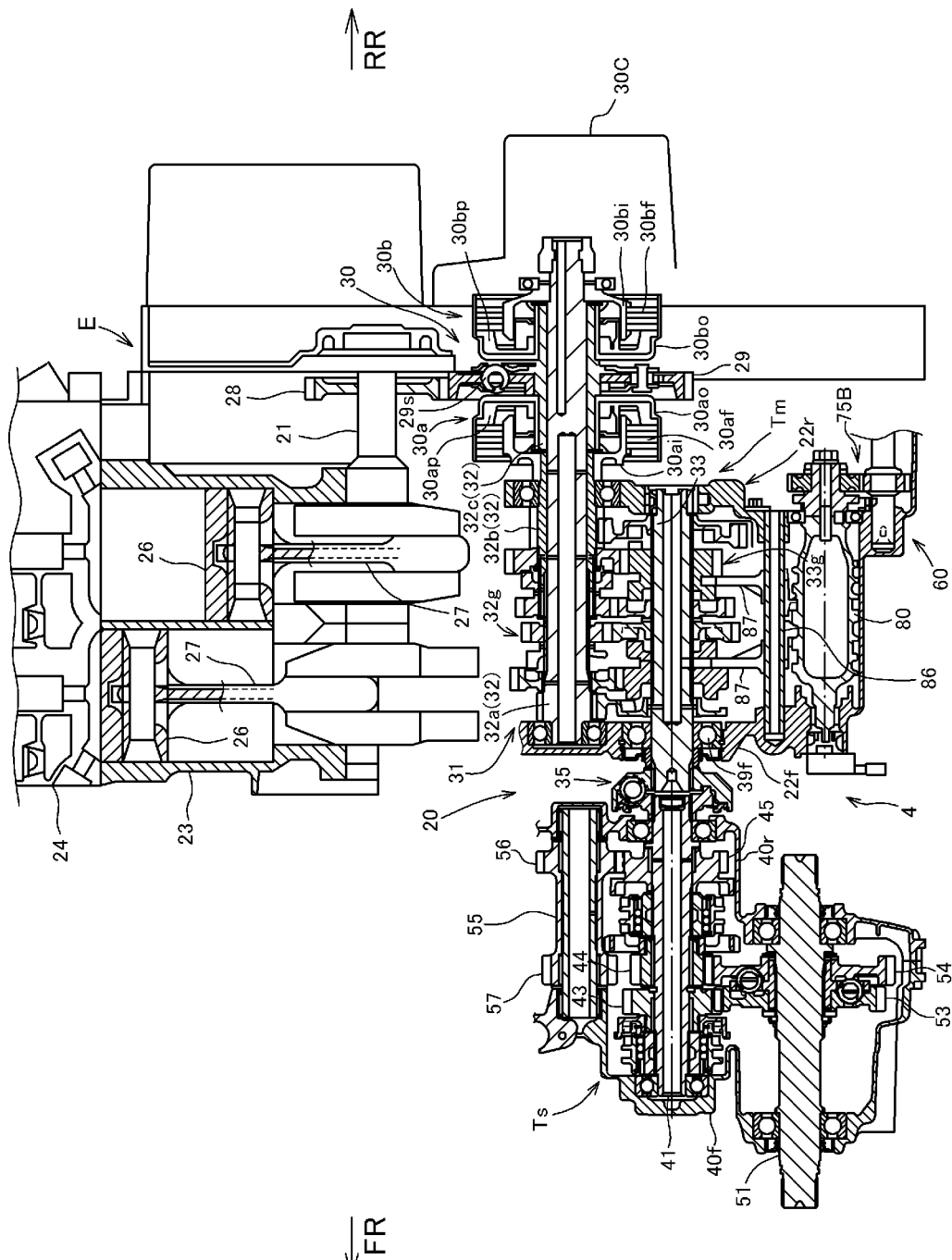
FIG. 4 is a developed sectional view of the vehicle power unit.

A sectional view of the power transmission apparatus 20 is depicted in FIG. 4.

Two cylinders are defined in the cylinder block 23 of the internal combustion engine E, arranged in series with each other longitudinally of the vehicle. A connecting rod 27 couples the crankshaft 21 with a piston 26, which slides along a mating cylinder bore in a reciprocating manner. The reciprocating motion of the piston 26 is translated to rotation of the crankshaft 21.

A primary drive gear 28 is fitted at a front end portion of the crankshaft 21, which is oriented in the fore-aft direction.

As shown in FIG. 3, a main shaft 32 of a transmission 31 of the main transmission Tm is located on the right of the crankshaft 21. As shown in FIG. 4, a main shaft outer tube 32b and a clutch portion outer tube 32c are disposed in juxtaposition laterally with each other, and fitted over an outer periphery of an elongate main shaft inner tube 32a, to thereby constitute the main shaft 32.

A counter shaft 33 is disposed below the main shaft 32 (see FIG. 4).

The main shaft 32 and the counter shaft 33 extend in parallel with each other and are oriented in the fore-aft direction. The main shaft 32 and the counter shaft 33 are journaled by a front-side case side wall 22f and a rear-side case side wall 22r at the front and rear, respectively, of the crankcase 22.

Six drive speed change gears 32g are disposed on the main shaft 32. Six driven speed change gears 33g, which are associated with, and constantly mesh with, the respective drive speed change gears 32g, are disposed on the counter shaft 33.

The drive speed change gears 32g for odd-numbered shift speeds are disposed on the main shaft inner tube 32a and the drive speed change gears 32g for even-numbered shift speeds are disposed on the main shaft outer tube 32b.

A pair of twin clutches 30, composed of a first clutch 30a and a second clutch 30b, is disposed on the clutch portion outer tube 32c, which extends toward the rear from a bearing in the rear-side case side wall 22R. A primary driven gear 29 is disposed at a center of the clutch portion outer tube 32c. Clutch outer members 30ao and 30bo of the first clutch 30a and the second clutch 30b, respectively, are splined on both sides of the primary driven gear 29 for restricted axial movement.

The center primary driven gear 29 meshes with the primary drive gear 28 on the crankshaft 21.

A clutch damper spring 29s is placed between the primary driven gear 29 and a central flange portion of the clutch portion outer tube 32c. The clutch damper spring 29s buffers variations in torque between the primary driven gear 29 and the clutch portion outer tube 32c.

A clutch inner member 30ai of the first clutch 30a is splined to the main shaft inner tube 32a for restricted axial movement. A clutch inner member 30bi of the second clutch 30b is splined to the main shaft outer tube 32b for restricted axial movement.

A friction plate group 30af (30bf) is an array of alternating drive friction plates that rotate together on the side of the clutch outer member 30ao (30bo) and driven friction plates that rotate together on the side of the clutch inner member 30ai (30bi). A pressure plate 30ap (30bp) is capable of pressing the friction plate group 30af (30bf).

A hydraulic circuit that selectively drives the pressure plate 30ap or 30bp is formed in the main shaft inner tube 32a, the clutch portion outer tube 32c, and a rear crankcase cover.

When the pressure plate 30ap is driven and the friction plate group 30af is accordingly pressed, the first clutch 30a is engaged and power applied to the primary driven gear 29 is transmitted to the main shaft inner tube 32a, so that the drive speed change gears 32g for the odd-numbered shift speeds rotate.

When the pressure plate 30bp is driven and the friction plate group 30bf is accordingly pressed, the second clutch 30b is engaged and power applied to the primary driven gear 29 is transmitted to the main shaft outer tube 32b, so that the drive speed change gears 32g for the even-numbered shift speeds rotate.

Two out of the six drive speed change gears 32g supported on the main shaft 32 are shifter gears that slide in the axial direction. Two out of the six driven speed change gears 33g supported on the counter shaft 33 are shifter gears that slide in the axial direction.

Figure 6:
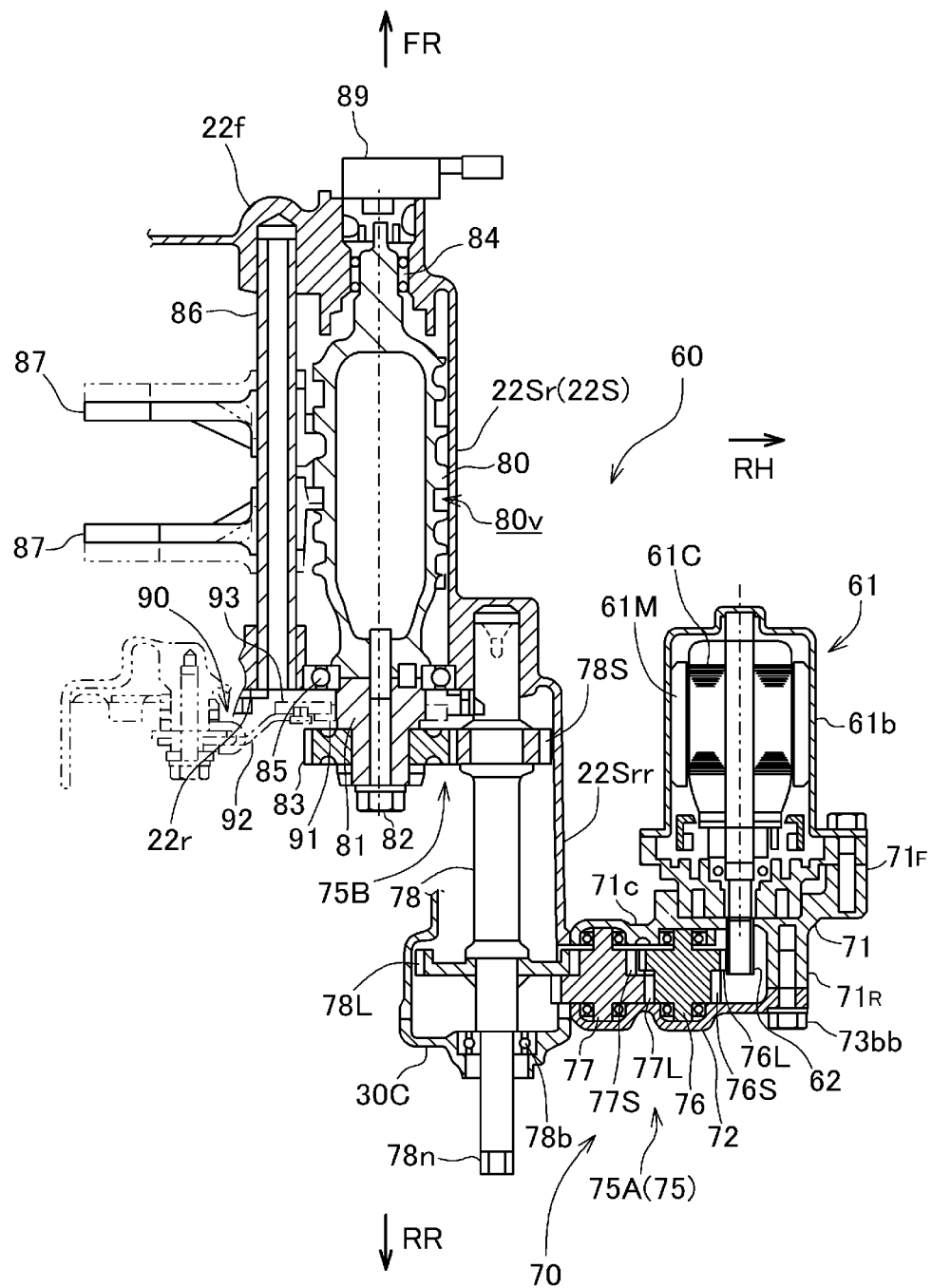
FIG. 6 is a developed sectional view of the major components of the vehicle power unit, as viewed on arrow VI-VI in FIG. 5.

As illustrated in FIG. 4, shift forks 87 and 87, which move the respective two shifter gears on the counter shaft 33, are supported on a shift fork shaft 86. The shift forks 87 and 87 and the shift fork shaft 86 are also illustrated in FIG. 6

The same shift structure is used for the main shaft 32, although not shown. That is, there are provided shift forks 87 and 87, which move the respective two shifter gears on the main shaft 32, and a shift fork shaft supporting the shift forks 87 and 87.

As is known in the art, the four shift forks 87 operate to change gears in mesh with each other to achieve effective power transmission by being moved through rotation of a shift drum 80 (see FIGS. 4 and 6), as guided by and along a guide groove formed in an outer peripheral surface of the shift drum 80.

As depicted in FIG. 3, the shift drum 80 is located on the right of the main shaft 32 by being supported by the front-side case side wall 22f and the rear-side case side wall 22r and between the two side walls 22f and 22r.

As illustrated in FIG. 6, the shift drum 80 is rotated by a shift motor 61 which is an electric motor.

The main transmission Tm can perform a gearshift operation by smoothly changing shift speeds (first to sixth shift speeds) through hydraulic control of the twin clutches 30 and drive control of the shift motor 61.

An output shaft of the main transmission Tm is the counter shaft 33, as will be noted from FIG. 4. The counter shaft 33 is disposed below the main shaft 32 (see FIG. 3). As will be noted from FIG. 4, the counter shaft 33 passes through the front-side case side wall 22f of the crankcase 22 to thereby protrude to the front side.

The subsidiary transmission Ts is disposed in front of the main transmission Tm in the vehicle power unit P.

The subsidiary transmission Ts has a case divided longitudinally into a front side subsidiary transmission case 40f and a rear side subsidiary transmission case 40r. The front side subsidiary transmission case 40f is joined with the rear side subsidiary transmission case 40r. The rear side subsidiary transmission case 40r is mounted on the front-side case side wall 22f of the crankcase 22 of the main transmission Tm by fasteners not depicted.

A transmission drive shaft 41 and the transmission driven shaft (output shaft) 51 are disposed in juxtaposition laterally. The transmission drive shaft 41 and the transmission driven shaft 51 allow speed change gears of the subsidiary transmission Ts to be in mesh with each other. An intermediate gear shaft 55 is disposed at a position obliquely above the transmission drive shaft 41 and the transmission driven shaft 51.

The transmission drive shaft 41, the transmission driven shaft 51, and the intermediate gear shaft 55, which constitute the subsidiary transmission Ts, extend in parallel with the crankshaft 21 to be oriented in the fore-aft direction. The transmission drive shaft 41, the transmission driven shaft 51, and the intermediate gear shaft 55 have respective front and rear ends supported by and between the front side subsidiary transmission case 40f and the rear side subsidiary transmission case 40r.

The transmission drive shaft 41 protrudes to the rear side from the rear side subsidiary transmission case 40r.

Meanwhile, the counter shaft 33, which passes through the front-side case side wall 22f of the crankcase 22 of the main transmission Tm by being supported by a bearing 39f to protrude to the front, is disposed rearward of, and coaxially with, the transmission drive shaft 41 such that the counter shaft 33 has an axial end face facing an axial end face of the transmission drive shaft 41.

A coupling torque damper 35 is disposed between the counter shaft 33 and the transmission drive shaft 41, which are coaxial with each other (see FIG. 4).

A high-speed drive gear 43 and a low-speed drive gear 44 are disposed in an axial center region of the transmission drive shaft 41 in juxtaposition with each other longitudinally and are rotatably supported on the transmission drive shaft 41. A reverse drive gear 45 is rotatably supported on a rear portion of the transmission drive shaft 41.

A enlarged-diameter intermediate gear 56 is formed on a rear portion of the intermediate gear shaft 55 and a reduced-diameter intermediate gear 57 is formed at a front portion of the intermediate gear shaft 55. The enlarged-diameter intermediate gear 56 on the rear side meshes with the reverse drive gear 45, which is rotatably journaled on the transmission drive shaft 41. The reduced-diameter intermediate gear 57 on the front side meshes with a low-speed driven gear 54, which is rotatably supported on the transmission driven shaft 51.

A high-speed driven gear 53 and the low-speed driven gear 54, both of which are supported on the transmission driven shaft 51, are in constant mesh with the high-speed drive gear 43 and the low-speed drive gear 44, respectively, supported on the transmission drive shaft 41.

The transmission driven shaft 51 as a power transmission shaft serves as an output shaft of the subsidiary transmission Ts and an output shaft of the vehicle power unit P.

Figure 5:
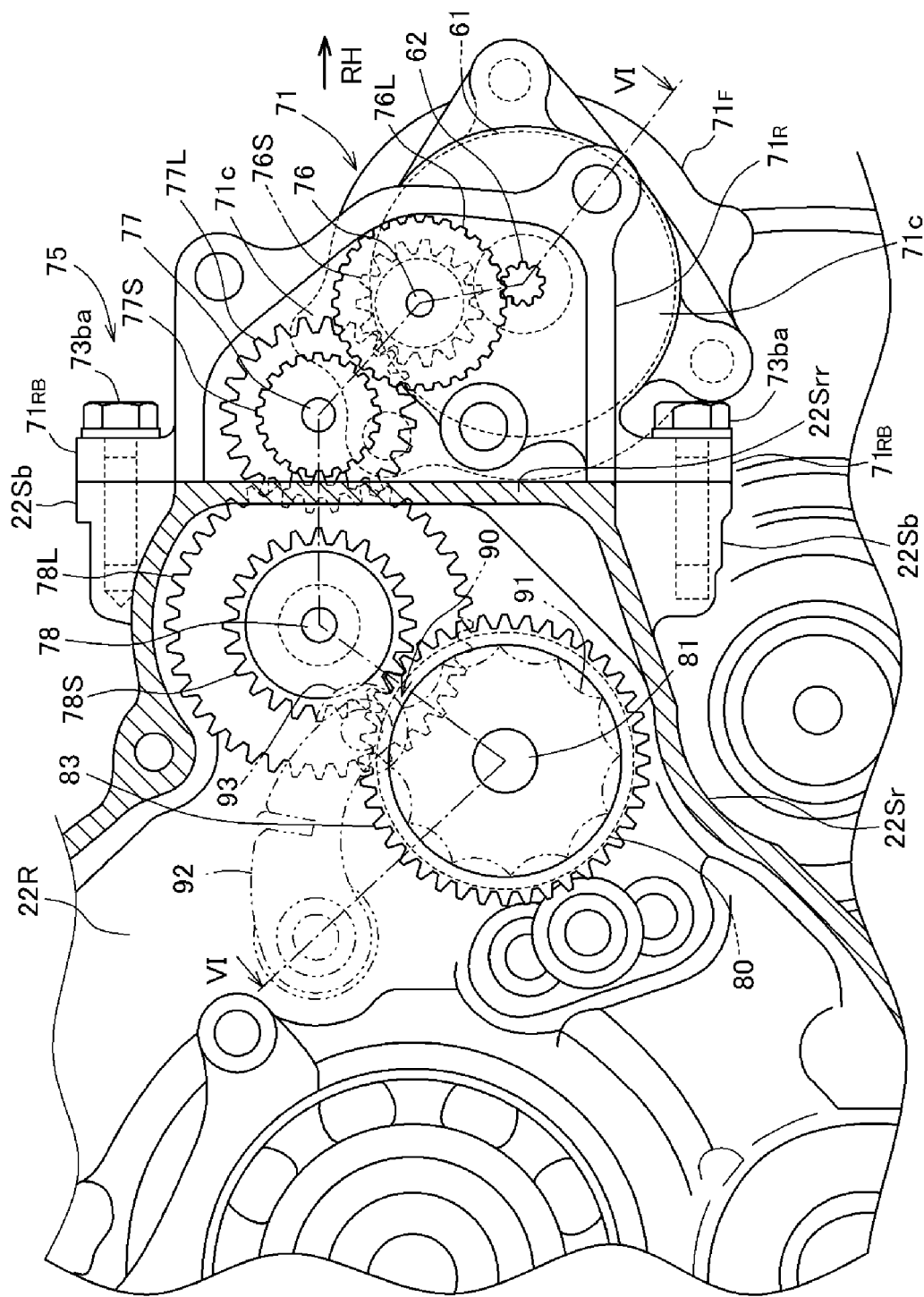
FIG. 5 is a rear view of major components of the vehicle power unit, with some of components of the vehicle power unit being omitted.

The power transmission apparatus 20, in which the main transmission Tm is combined with the subsidiary transmission Ts as described above, has a speed change drive mechanism 60, shown in FIGS. 5 and 6, which changes the shift speed of the main transmission Tm. The speed change drive mechanism 60 includes the shift motor 61, a reduction gear mechanism 70, the shift drum 80, the shift fork shaft 86, and the shift forks 87.

The shift drum 80 is supported rotatably by the front-side case side wall 22f and the rear-side case side wall 22r of the crankcase 22 (main transmission case 22t) on the right of the main shaft 32 so as to extend in parallel with the main shaft 32, via a needle bearing 84 (see FIG. 6) at a front end portion thereof and a ball bearing 85 (see FIG. 6) at a rear end portion thereof.

A drum rotational angle sensor 89 is disposed at a front rotary shaft portion that passes through the needle bearing 84 of the shift drum 80. The drum rotational angle sensor 89 operates to detect an angular position of the shift drum 80.

A drum rotary shaft member 81 is coaxially and fixedly attached by a bolt 82 at a rear end portion of the shift drum 80. A joint between the shift drum 80 and the drum rotary shaft member 81 is supported by the rear-side case side wall 22r via the ball bearing 85.

A driven gear 83 is fitted over the drum rotary shaft member 81, which passes through the rear-side case side wall 22r at the rear end portion of the shift drum 80 to thereby protrude to the rear.

The crankcase 22 has a case peripheral wall 22S shown in FIG. 6. The case peripheral wall 22S is formed to couple peripheral edges of the respective front-side case side wall 22f and the rear-side case side wall 22r, which face each other, so as to cover the crankshaft 21, the main shaft 32, and the counter shaft 33. The case peripheral wall 22S includes a rear side case peripheral wall portion 22Sr. The rear side case peripheral wall portion 22Sr is extended to the rear further from the rear-side case side wall 22r. The driven gear 83 on the rear end portion of the shift drum 80 and the twin clutches 30 at the rear end portion of the main shaft 32 are located inside the rear side case peripheral wall portion 22Sr.

As will be noted from FIG. 6, the reduction gear mechanism 70 is installed from the right side on a right side perpendicular wall portion 22Srr of the rear side case peripheral wall portion 22Sr.

In the reduction gear mechanism 70, as illustrated in FIGS. 5 and 6, an extended support wall 71 is provided so as to extend toward the right in parallel with the rear-side case side wall 22r. The extended support wall 71 is secured to the right side perpendicular wall portion 22Srr at a position displaced rearward from the rear-side case side wall 22r.

The extended support wall 71 includes a vertical wall portion $71_C$, an annular frame wall portion $71_R$, and a circularly annular frame wall portion $71_F$. The vertical wall portion $71_C$ extends in parallel with the rear-side case side wall 22r. The annular frame wall portion $71_R$ extends toward the rear of the vertical wall portion $71_C$. The circularly annular frame wall portion $71_F$ overlaps the annular frame wall portion $71_R$ of the vertical wall portion $71_C$ and extends toward the front at a portion protruding partially to the right lower direction.

Reference is made to FIG. 5. The extended support wall 71 is attached as follows. Specifically, the annular frame wall portion $71_R$ has a left end vertical surface abutting from the right side on the right side vertical wall portion 22Srr. Brackets $71_{RB}$ and $71_{RB}$ disposed at upper and lower left ends of the annular frame wall portion $71_R$ are fixed by bolts 73ba to mounting bosses 22Sb formed at upper and lower ends of the right side vertical wall portion 22Srr.

When the extended support wall 71 is mounted on the right side vertical wall portion 22Srr of the rear side case peripheral wall portion 22Sr of the case peripheral wall 22S as described above, the extended support wall 71 is in parallel with the rear-side case side wall 22r and located at a position displaced rearward from the rear-side case side wall 22r as depicted in FIG. 6.

The shift motor 61 is mounted on the circularly annular frame wall portion $71_F$ at the front side of the extended support wall 71 such that a drive gear 62 of the shift motor 61 protrudes to the rear from a rear side surface of the vertical wall portion $71_C$.

The drive gear 62 passes through the vertical wall portion $71_C$ to extend to the rear and to protrude into an inside space defined by the annular frame wall portion $71_R$.

As depicted in FIG. 6, the shift motor 61 has a motor main body 61b protruding to the front from the extended support wall 71.

The driven gear 83 is fitted over the drum rotary shaft member 81, which is joined to the rear end portion of the shift drum 80 and passes through the rear-side case side wall 22r to extend rearward. The drive gear 62 of the shift motor 61, which is mounted on the vertical wall portion $71_C$ of the extended support wall 71, passes through the vertical wall portion $71_C$, which is displaced rearward from the rear-side case side wall 22r, to thereby extend to the rear. The driven gear 83 and the drive gear 62 are thus disposed, respectively, along rear side surfaces of the rear-side case side wall 22r and the vertical wall portion $71_C$, which are mutually displaced in the fore-aft direction.

Thus, while the shift drum 80 is disposed forward of the rear-side case side wall 22r, the motor main body 61b of the shift motor 61 is also disposed forward of the extended support wall 71. Such arrangement allows the motor main body 61b of the shift motor 61 not to protrude outward or rearward in the vehicle fore-aft direction and to be compactly arranged.

A reduction gear train 75 transmits power from the drive gear 62 to the driven gear 83. Gears of the reduction gear train 75 are supported by the extended support wall 71 and the rear-side case side wall 22r and disposed in sequence in a left-right direction.

A part of the reduction gear train 75 is disposed inside the annular frame wall portion $71_R$, which extends on the rear side of the vertical wall portion $71_C$ of the extended support wall 71. A cover member 72 covers a rear side opening within the annular frame wall portion $71_R$.

The cover member 72 has a faying surface abutting on an opening axial end surface of the annular frame wall portion $71_R$ and is fastened by a plurality of bolts 73bb in a circumferential direction. A gear chamber is thereby defined inside.

The twin clutches 30 are covered by a clutch cover 30C (see FIG. 4) from the rear. The clutch cover 30C also covers the driven gear 83, which is fitted on the drum rotary shaft member 81 passing through the rear-side case side wall 22r at the rear end portion of the shift drum 80.

The reduction gear train 75 is designed to have four reduction speeds. Three gear shafts 76, 77, and 78 are provided to be oriented in the fore-aft direction. The gear shafts 76, 77, and 78 are arranged with their front ends supported by the extended support wall 71 and the rear-side case side wall 22r and with their rear ends supported by the cover member 72 and the clutch cover 30C.

The first gear shaft 76, which is located at the rightmost position among the three gear shafts 76, 77, and 78, is disposed above the drive gear 62 of the shift motor 61. The second gear shaft 77 is located at an obliquely left upward position of the first gear shaft 76. The first gear shaft 76 and the second gear shaft 77 have their front and rear ends supported by the extended support wall 71 and the cover member 72, respectively. The third gear shaft 78 is located at an obliquely right upward position of the driven gear 83 and on the left side of the second gear shaft 77. The third gear shaft 78 have its front and rear ends supported by the rear-side case side wall 22R and the clutch cover 30C, respectively.

An enlarged-diameter gear 76L and a reduced-diameter gear 76S are integrally formed with the first gear shaft 76. An enlarged-diameter gear 77L and a reduced-diameter gear 77S are integrally formed with the second gear shaft 77. An enlarged-diameter gear 78L and a reduced-diameter gear 78S are supported on the third gear shaft 78.

The drive gear 62, which has a reduced diameter and protrudes to the rear from the rear side surface of the vertical wall portion $71_C$ of the shift motor 61, meshes with the enlarged-diameter gear 76L of the first gear shaft 76 to thereby to produce a first reduction speed R1. The reduced-diameter gear 76S of the first gear shaft 76 meshes with the enlarged-diameter gear 77L of the second gear shaft 77 to thereby produce a second reduction speed R2. The reduced-diameter gear 77S of the second gear shaft 77 meshes with the enlarged-diameter gear 78L of the third gear shaft 78 to thereby produce a third reduction speed R3. The reduce-diameter gear 78S of the third gear shaft 78 meshes with the driven gear 83 to thereby produce a fourth reduction speed R4.

Specifically, the reduction gear train 75 has the four reduction speeds of the first, second, third, and fourth reduction speeds R1, R2, R3, and R4.

The third gear shaft 78 extends rearward from the rear-side case side wall 22r by which the front end of the third gear shaft 78 is supported. The third gear shaft 78 has a rear portion disposed beyond the extended support wall 71, which is displaced rearward. The rear portion of the third gear shaft 78 is supported by the clutch cover 30C via a bearing 78b.

The enlarged-diameter gear 78L of the third gear shaft 78 is disposed at a position on the rear side surface of the vertical wall portion $71_C$ of the extended support wall 71. The gear train from the drive gear 62 to the enlarged-diameter gear 78L of the third gear shaft 78 and, which gear train is disposed on and along the rear side surface of the vertical wall portion $71_C$, constitutes a drive-side reduction gear train 75A.

The drive-side reduction gear train 75A constitutes the first, second, and third reduction speeds R1, R2, and R3.

The reduced-diameter gear 78S of the third gear shaft 78 is disposed to extend along a rear surface of the rear-side case side wall 22r. The reduced-diameter gear 78S of the third gear shaft 78 and the driven gear 83 constitute a driven-side reduction gear train 75B.

The reduced-diameter gear 78S of the third gear shaft 78 meshes with the driven gear 83, and the driven-side reduction gear train 75B constitutes the fourth reduction speed R4.

Thus, the reduction gear train 75 is divided into the drive-side reduction gear train 75A on the rear side and the driven-side reduction gear train 75B on the front side.

As described above and as will be noted from FIG. 6, the extended support wall 71 is disposed so as to extend in parallel with the rear-side case side wall 22r, which supports the drum rotary shaft member 81 on which the driven gear 83 is disposed. Further, the extended support wall 71 is disposed so as to extend to the outside in the vehicle width direction. Furthermore, the gears of the reduction gear train 75, which has the four reduction speeds to transmit power from the drive gear 62 of the shift motor 61 mounted on the extended support wall 71 to the driven gear 83, are arranged by being supported on the extended support wall 71 and the rear-side case side wall 22r. The speed change drive mechanism 60 is thus integrated on the rear-side case side wall 22r, which is on one side of the speed change drive mechanism 60, and on the extended support wall 71, whereby the transmission apparatus T can be prevented from becoming enlarged in size and reduction in size of the vehicle power unit P can be promoted.

In addition, the driving power of the shift motor 61 is transmitted for rotation of the shift drum 80 via only the reduction gear train 75. This configuration eliminates the need for an intermittent feed mechanism, so that a simplified structure can be achieved by reducing the number of parts used in the speed change drive mechanism 60. Thus, the transmission apparatus T can be prevented from becoming large in size and reduction in size and cost of the vehicle power unit P can be further promoted. Furthermore, a quick and smooth gearshift operation can be performed through use of an electric motor.

The omission of the intermittent feed mechanism leads to gearshift noise not generated by the intermittent feed mechanism, thus eliminating the need for a sound isolation structure.

The reduction gear train 75 is divided into the drive-side reduction gear train 75A on the rear side and the driven-side reduction gear train 75B on the front side. The drive-side reduction gear train 75A on the rear side has the three reduction speeds of the first, second, and third reduction speeds R1, R2, and R3, and the driven-side reduction gear train 75B on the front side has the one reduction speed of the fourth reduction speed R4. The drive-side reduction gear train 75A has reduction speeds greater in number than the driven-side reduction gear train 75B.

As such, the reduction gear train 75 is divided into the drive-side reduction gear train 75A on the rear side and the driven-side reduction gear train 75B on the front side. The shift motor 61, which is mounted on the extended support wall 71 supporting the drive side reduction gear train 75A, has a greater degree of freedom in disposition, so that the shift motor 61 can be disposed at a position at which the shift motor 61 does not interfere with any other member and does not protrude.

Because the drive-side reduction gear train 75A has the reduction speeds greater in number than the driven-side reduction gear train 75B, the drive-side reduction gear train 75A has a greater degree of freedom in disposition. This leads to an increased degree of freedom in disposing the shift motor 61, so that the shift motor 61 can be spaced away from the crankcase to thereby form a clearance around the shift motor 61, which leads to improved cooling performance of the shift motor 61.

Moreover, the enlarged-diameter gear 78L of the third gear shaft 78 is disposed on the side close to the drive-side reduction gear train 75A on the extended support wall 71, which is located rearward of the driven-side reduction gear train 75B, and the reduced-diameter gear 78S of the third gear shaft 78 is incorporated in the driven-side reduction gear train 75B. This arrangement allows the third gear shaft 78 to be disposed close to the shift drum 80, so that the reduction gear train 75 can be integrated and arranged in a compact manner.

The shift motor 61 is provided in such a protruding arrangement that the drive gear 62 is positioned at the rear side location and the shift motor main body 61b is positioned at the front side location. The shift motor 61 can thus be effectively cooled by vehicle running air flow.

The third gear shaft 78, which is elongated in the fore-aft direction, is used as a manual gearshift operation shaft. The third gear shaft 78 has a rear end portion passing through the clutch cover 30C to protrude to the rear. The rear end portion of the third gear shaft 78 serves as a gearshift operation knob 78n to which a manual gearshift operating force is applied.

A manual gearshift operation mechanism can be readily added, because the third gear shaft 78 is used as the manual gearshift operation shaft.

The rear end portion of the third gear shaft 78 passing through the clutch cover 30C to protrude therefrom is used as the gearshift operation knob 78n. This configuration results in the gearshift operation knob 78n being disposed at a position remote from the rear side of the crankcase 22 and being readily noticeable for improved operability.

As described above, the reduction gear train 75 includes the drive-side reduction gear train 75A, which has the first, second, and third reduction speeds R1, R2, and R3, and the driven-side reduction gear train 75B, which has the fourth reduction speed R4.

Thus, rotation of the drive gear 62 of the shift motor 61 is transmitted to the driven gear 83 through a speed reduction achieved by the four reduction speeds of the first, second, third, and fourth reduction speeds R1, R2, R3, and R4 of the reduction gear train 75, thereby to be transmitted to rotate the shift drum 80 integrated with the driven gear 83.

The rotation of the shift drum 80 causes the shift forks 87 to be guided by a lead groove 80v formed in the outer peripheral surface of the shift drum 80 and to be moved in the axial directions, so that the shift speeds of the main transmission Tm are changed.

The drive gear 62, the enlarged-diameter gear 76L, the reduced-diameter gear 76S, the enlarged-diameter gear 77L, the reduced-diameter gear 77S, the enlarged-diameter gear 78L, the reduced-diameter gear 78S, and the driven gear 83 in the reduction gear train 75 have numbers of gear teeth of 11, 45, 15, 24, 13, 38, 23, and 35, respectively.

Thus, in the reduction gear train 75, the first reduction speed R1 has a reduction gear ratio of approximately 4.1 (=45/11), the second reduction speed R2 has a reduction gear ratio of approximately 1.6 (=24/15), the third reduction speed R3 has a reduction gear ratio of approximately 2.9 (=38/13), and the fourth reduction speed R4 has a reduction gear ratio of approximately 1.5 (=35/23). The reduction gear train 75 is set to have an overall reduction gear ratio of approximately 29.1.

The shift motor 61 is a permanent magnet field DC commutator motor. The shift motor 61 includes ten coils 61C disposed in a circumferential direction on the side of a rotor and a permanent magnet 61M having ten pole pieces disposed in a circumferential direction of a stator on the outer peripheral side of the rotor.

The shift motor 61 develops cogging torque of a maximum of approximately 0.052 Nm generated through action by a magnetic force of the permanent magnet 61M on a coil iron core when no current flows therethrough.

Figure 7:
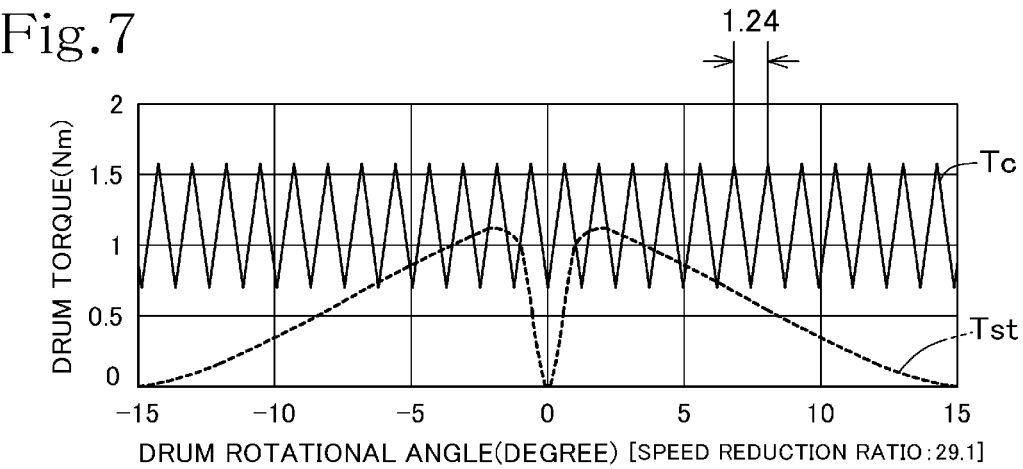
FIG. 7 is a graph depicting changes in cogging torque acting on a shift drum when a reduction gear train has a reduction gear ratio of 29.1.

FIG. 7 depicts changes in the cogging torque acting on the shift drum 80 with respect to a rotational angle of the shift drum 80 when, in the speed change drive mechanism 60 as described above, the shift drum 80 is rotated by drive of the shift motor 61 through the reduction gear train 75, which has a reduction gear ratio of approximately 29.1.

In the graph depicted in FIG. 7, the abscissa represents the rotational angle of the shift drum 80 (drum rotational angle) (degrees). In FIG. 7, with the drum rotational angle in a predetermined shift speed position defined as 0 degrees, rotation in an upshift side is a positive rotational angle and rotation in a downshift side is a negative rotational angle.

In FIG. 7, the ordinate represents torque acting on the shift drum 80 (drum torque) (Nm).

The cogging torque acting on the drive gear 62 of the shift motor 61 pulsates during rotation and marks a maximum value of approximately 0.052 Nm.

The cogging torque acting on the drive gear 62 results in pulsation of a maximum of 1.51 (=0.052×29.1) Nm, as depicted in FIG. 7, as the drum torque acting on the shift drum 80 through drive transmission achieved by the reduction gear train 75, which has a reduction gear ratio of approximately 29.1.

The shift motor 61 includes the ten coils 61C and the permanent magnet 61M having ten pole pieces. The cogging torque pulsates ten times per rotation of the drive gear 62, specifically, the cogging torque pulsates every rotational angle of 36 degrees. Thus, the cogging torque Tc acting on the shift drum 80 through the drive transmission achieved by the reduction gear train 75 having a reduction gear ratio of approximately 29.1 pulsates once per every rotational angle of the shift drum 80 of 1.24 (=36/29.1) degrees, as depicted in FIG. 7.

In FIG. 7, the curved broken line indicates stopper torque $T_{st}$, which acts on the shift drum from a stopper mechanism that correctly positions the angular position of the shift drum.

As depicted by the dash-double-dot line in FIGS. 5 and 6, a stopper mechanism 90 includes a stopper roller 93 and a star-shaped cam 91. The star-shaped cam 91 is disposed on the drum rotary shaft member 81 of the shift drum 80. The stopper roller 93 is rotatably supported on a distal end portion of a swingably pivoted stopper arm 92. The stopper roller 93 is acted upon by an alternately protruded and recessed cam surface of the star-shaped cam 91. When the stopper roller 93 is engaged by or fits in one of the recesses of the alternately protruded and recessed cam surface of the star-shaped cam 91, the shift drum is positioned correctly at an angular position to produce a required shift speed.

As depicted in FIG. 7, the torque acting on the shift drum from the stopper mechanism 90 is 0 at 0 degree of the drum rotational angle in a predetermined shift speed position and the torque rises sharply on both sides of the drum rotational angle of 0 degree.

The stopper roller 93 fits in a recess in the alternately protruded and recessed cam surface of the star-shaped cam 91 when the drum rotational angle is 0 degree. To perform a gearshift operation by rotating the shift drum 80 from the foregoing condition, torque of approximately 1.15 Nm or more as a peak of torque that rises sharply on both sides of the drum rotational angle of 0 degree is required and the shift drum 80 cannot be rotated by torque of less than approximately 1.15 Nm.

When the stopper torque $T_{st}$, which acts on the shift drum from the stopper mechanism 90, is compared with the cogging torque Tc, which acts on the shift drum 80, the cogging torque Tc is approximately 1.51 Nm maximum, which exceeds the maximum value of the stopper torque $T_{st}$ of approximately 1.15 Nm, as depicted in FIG. 7.

Thus, in the speed change drive mechanism 60 including the shift motor 61 and the reduction gear train 75, the cogging torque Tc acting on the shift drum 80 achieves a positioning function achieved by the stopper mechanism 90, so that the stopper mechanism 90 could be eliminated.

Additionally, the speed change drive mechanism 60 also omits the intermittent feed mechanism that has hitherto been required. Even without the use of the intermittent feed mechanism, the reduction gear train 75 is effectively used for braking the shift motor 61 through the cogging torque, to thereby reduce an overshoot of the shift drum 80, so that the shift drum 80 can be brought to a stop accurately at a target angle.

As such, the speed change drive mechanism 60 can easily bring the shift drum 80 to a stop at a required angular position even without the use of the intermittent feed mechanism and the stopper mechanism. The number of parts used in the speed change drive mechanism 60 can thus be reduced, so that the structure can be simplified and cost reduction can be achieved.

Because the reduction gear train 75 has the four reduction speeds of the first, second, third, and fourth reduction speeds R1, R2, R3, and R4, the reduction gear ratios of the first, second, third, and fourth reduction speeds R1, R2, R3, and R4 can be minimized as being approximately 4.1, approximately 1.6, approximately 2.9, and approximately 1.5, respectively. The enlarged-diameter gears 76L, 77L, and 78L for the respective reduction speeds and the driven gear 83 can have reduced diameters, so that the gears in the reduction gear train can be compactly arranged.

The reduction gear train 75, which is arranged compactly in the simplified speed change drive mechanism 60, is supported, together with the shift motor 61, on the extended support wall 71, which is arranged to extend to the outside in the vehicle width direction (toward the right) in parallel with the rear-side case side wall 22r of the crankcase 22 supporting the drum rotary shaft member 81 of the shift drum 80, on which the driven gear 83 is mounted. Thus, the speed change drive mechanism 60 is integrated on both the rear-side case side wall 22r and the extended support wall 71, so that the transmission apparatus T can be prevented from becoming large in size and reduction in size of the vehicle power unit P can be promoted.

In the embodiment described above, the reduction gear train 75 in the speed change drive mechanism 60 is set to have a reduction gear ratio of 29.1 and the shift drum 80 can be brought to a stop at any required angular position even with the stopper mechanism 90 omitted and with the intermittent feed mechanism omitted. The stopper mechanism is, however, difficult to be dispensed with when the reduction gear ratio of the reduction gear train 75 is smaller than 23.

Figure 8:
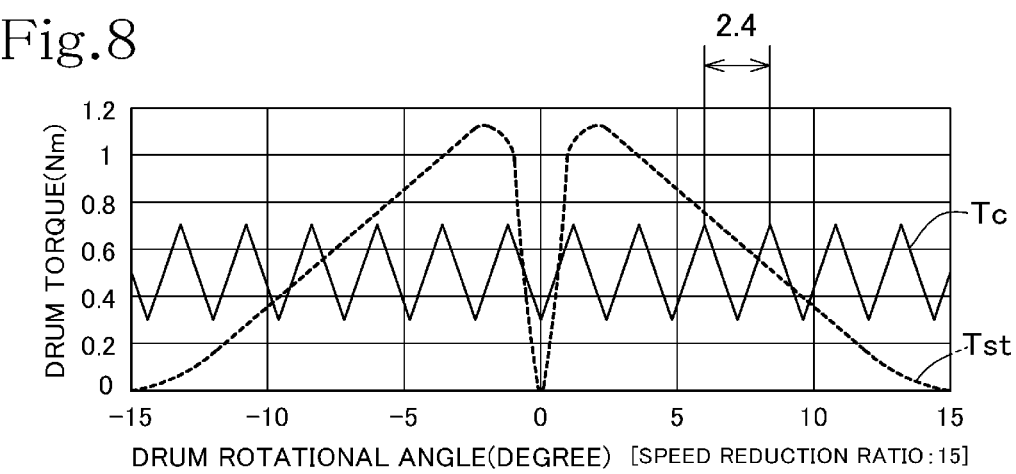
FIG. 8 is a graph depicting changes in the cogging torque acting on the shift drum when the reduction gear train has a reduction gear ratio of 15.

FIG. 8 depicts changes in the cogging torque acting on the shift drum when the reduction gear train has a reduction gear ratio of 15, as applied to the shift motor 61 of the above embodiment.

The cogging torque Tc acting on the shift drum has a maximum value of approximately 1.74 Nm and is below approximately 1.15 Nm as the maximum value of the stopper torque $T_{st}$.

Thus, some values of the cogging torque Tc achieved by the shift motor 61 are unable to perform the positioning function of the stopper mechanism. Thus, the stopper mechanism 90 as depicted by the dash-double-dot line in FIGS. 5 and 6 is required.

The intermittent feed mechanism that has hitherto been required is, however, not required. The number of parts used in the speed change drive mechanism 60 is thus reduced by the number of parts used in the intermittent feed mechanism. Structure can thus be simplified, the transmission apparatus can be prevented from becoming large, and reduction in size of the vehicle power unit P can be promoted.

The omission of the intermittent feed mechanism leads to gearshift noise not generated by the intermittent feed mechanism, thus eliminating the need for a sound isolation structure.

Figure 9:
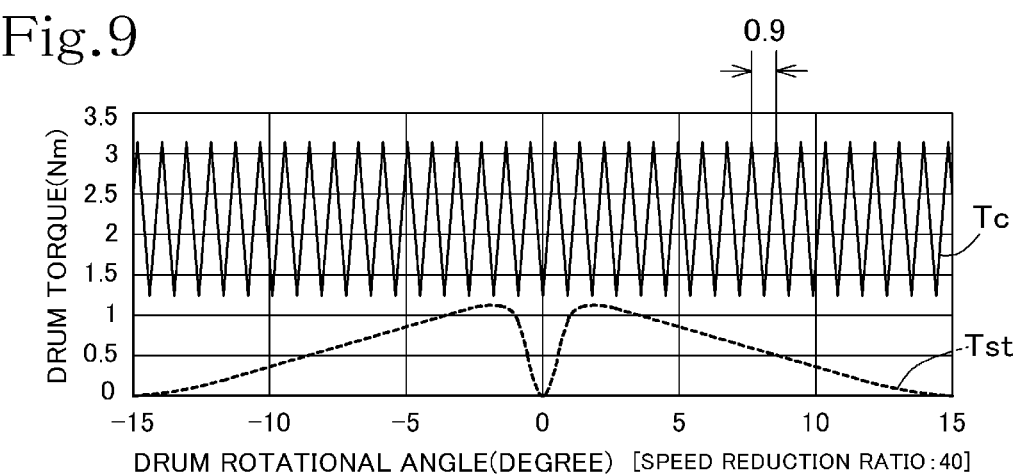
FIG. 9 is a graph depicting changes in the cogging torque acting on the shift drum when the reduction gear train has a reduction gear ratio of 40.

FIG. 9 depicts changes in the cogging torque acting on the shift drum when the reduction gear train has a large reduction gear ratio, for example, when the reduction gear train has a reduction gear ratio of 40.

The shift motor used is the one used in the above described embodiment.

As depicted in FIG. 9, the cogging torque Tc acting on the shift drum has a maximum value of approximately 3.2 Nm that is considerably greater than approximately 1.15 Nm as the maximum value of the stopper torque $T_{st}$.

Thus, the cogging torque Tc achieved by the shift motor 61 can reliably perform the positioning function of the shift drum, so that the stopper mechanism together with the intermittent feed mechanism is not required.

Changing of the shift speeds is slower at greater reduction gear ratios of the reduction gear train.

When the reduction gear ratio of the reduction gear train exceeds 45, a longer time is required for speed change gears to move. A longer time is thus required for changing the shift speeds, so that engagement of a dog clutch is not smooth.

This requires an increase in size and power output of the shift motor.

A small-sized shift motor can develop a cogging torque of a maximum of approximately 0.05 Nm. When the maximum value of the cogging torque falls below 0.04 Nm, positioning of the shift drum becomes difficult. A maximum value of the cogging torque exceeding 0.07 Nm makes rotational drive of the shift motor unsmooth and increases size and weight of the shift motor.

A vehicle power unit P' according to another embodiment will be described below with reference to FIGS. 10 to 12.

The vehicle power unit P' is mounted on a motorcycle and includes an internal combustion engine E' and a transmission apparatus T'. The internal combustion engine E' is what is called a horizontally opposed, six-cylinder, water-cooled, four-stroke cycle engine mounted on the vehicle longitudinally, including a crankshaft 107, which extends in the vehicle fore-aft direction. The transmission apparatus T' is a twin-clutch type that is coupled with the internal combustion engine E' and that establishes a predetermined shift speed from the power of the internal combustion engine E'.

In the following description, expressions indicating directions including front and rear and right and left comply with common directions with reference to a straight-forward direction of the motorcycle defined as being forward.

Figure 10:
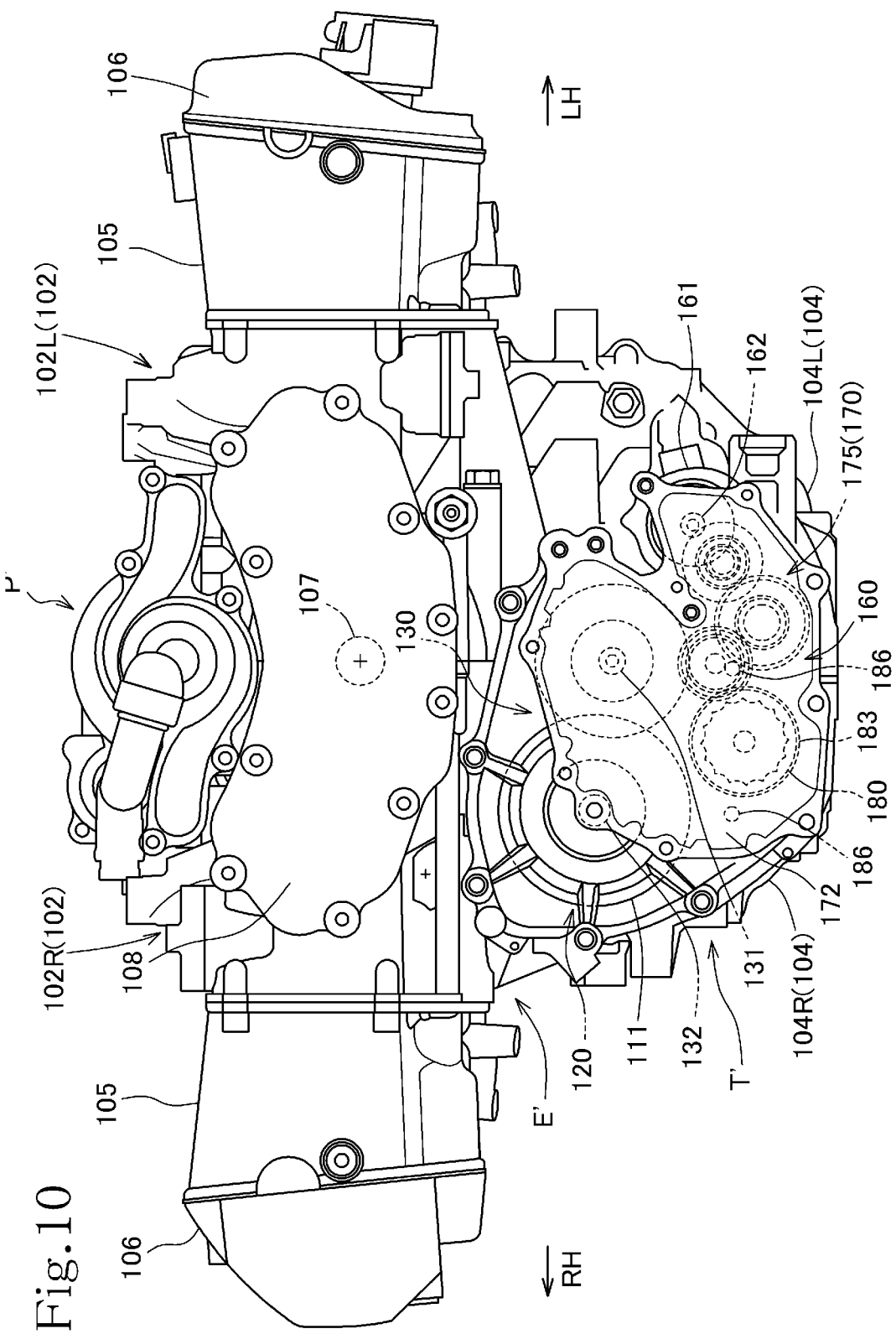
FIG. 10 is a front view of a vehicle power unit according to another embodiment.

Reference is made to FIG. 10. The internal combustion engine E' includes an engine cylinder block 102, cylinder heads 105, and cylinder head covers 106. The engine cylinder block 102 includes a left engine block half body 102L and a right engine block half body 102R. In a view facing the forward traveling direction of the motorcycle, the left engine block half body 102L is disposed on the left side and the right engine block half body 102R is disposed on the right side. The cylinder heads 105 are coupled with respective left and right ends of the left engine block half body 102L and the right engine block half body 102R. The cylinder head covers 106 are placed over the respective cylinder heads 105.

As depicted in FIG. 10, a front cover 108, which covers a front surface of an upper portion of the engine cylinder block 102, is mounted on the front surface of the upper portion of the engine block 102 such that the front cover 108 has the crankshaft 107 at a center thereof.

A transmission chamber that houses a transmission 130 of the transmission apparatus T' is defined by a left crankcase half body 104L and a right crankcase half body 104R at a lower portion of the engine cylinder block 102.

The transmission 130 is housed in the transmission chamber in a crankcase 104, which is the left crankcase half body 104L combined with the right crankcase half body 104R. The transmission 130 includes a main shaft 131 and a counter shaft 132. The main shaft 131 is disposed below the crankshaft 107. The counter shaft 132 is disposed on the right side of the main shaft 131.

The main shaft 131 and the counter shaft 132 extend in parallel with each other and are oriented in the fore-aft direction. The main shaft 131 and the counter shaft 132 are rotatably supported by a front-side case side wall 104F at the front of the crankcase 104 and a rear-side case side wall, not depicted, in the rear of the crankcase 104.

As depicted in FIG. 10, a speed change drive mechanism 160, which changes shift speeds of the transmission 130, is disposed to extend in the left-right direction at a position below a position ahead of the main shaft 131 and in front of the front-side case side wall 104F.

Figure 11:
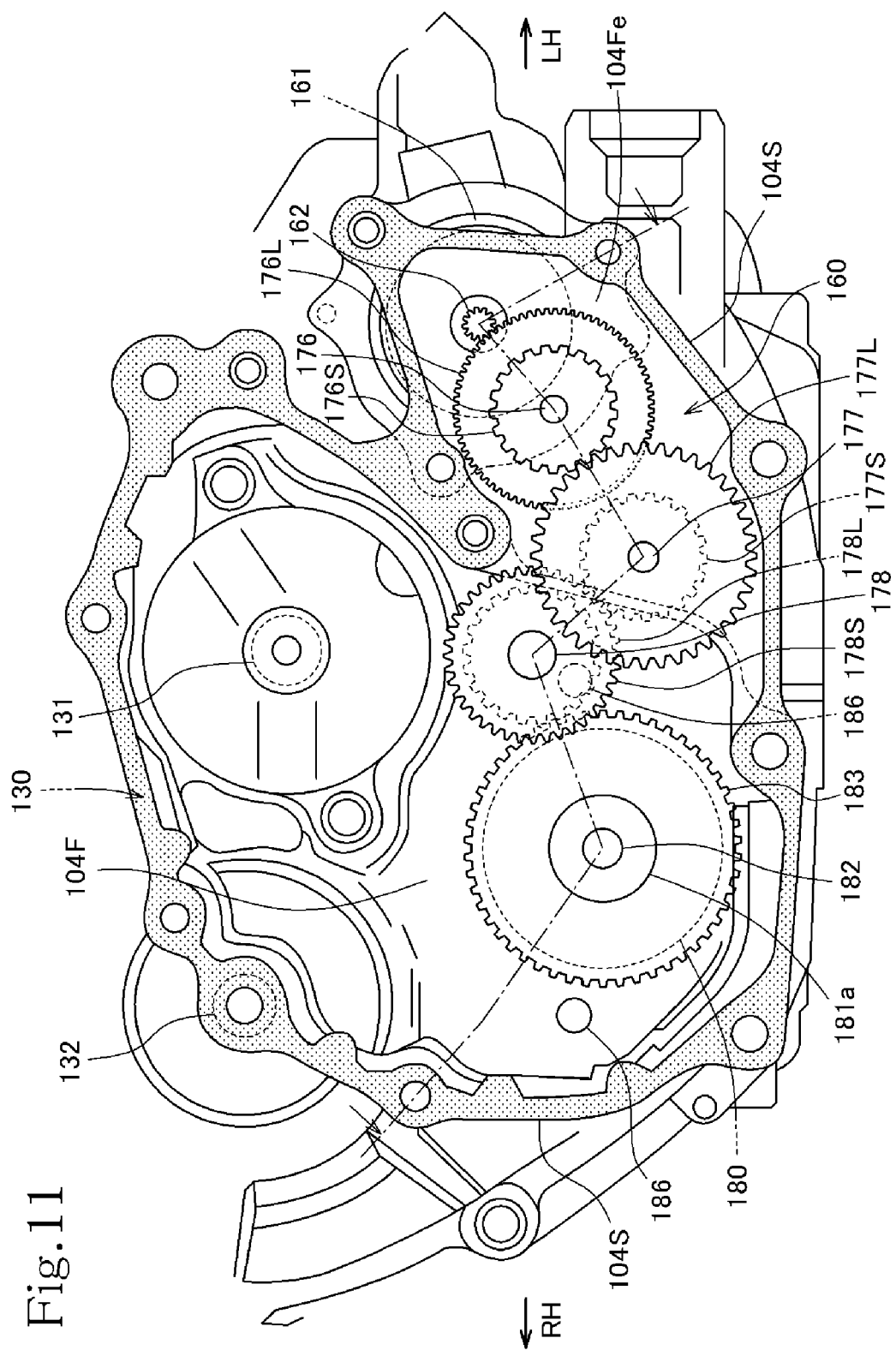
FIG. 11 is a front view of major components of the vehicle power unit, with some of components of the vehicle power unit omitted.

Reference is made to FIGS. 10 and 11. A shift drum 180 is disposed along a bottom wall of the crankcase 104 at a position below the main shaft 131 and the counter shaft 132 equidistantly from the main shaft 131 and the counter shaft 132. The shift drum 180 is thereby journaled and supported by the front-side case side wall 104F and the rear-side case side wall.

Shift fork shafts 186 extend across the front-side case side wall 104F and the rear-side case side wall at positions obliquely and slightly upward of the shift drum 180 on left and right sides, respectively. Shift forks 187 are supported by the respective shift fork shafts 186 so as to be slidable in the fore-aft direction.

Figure 12:
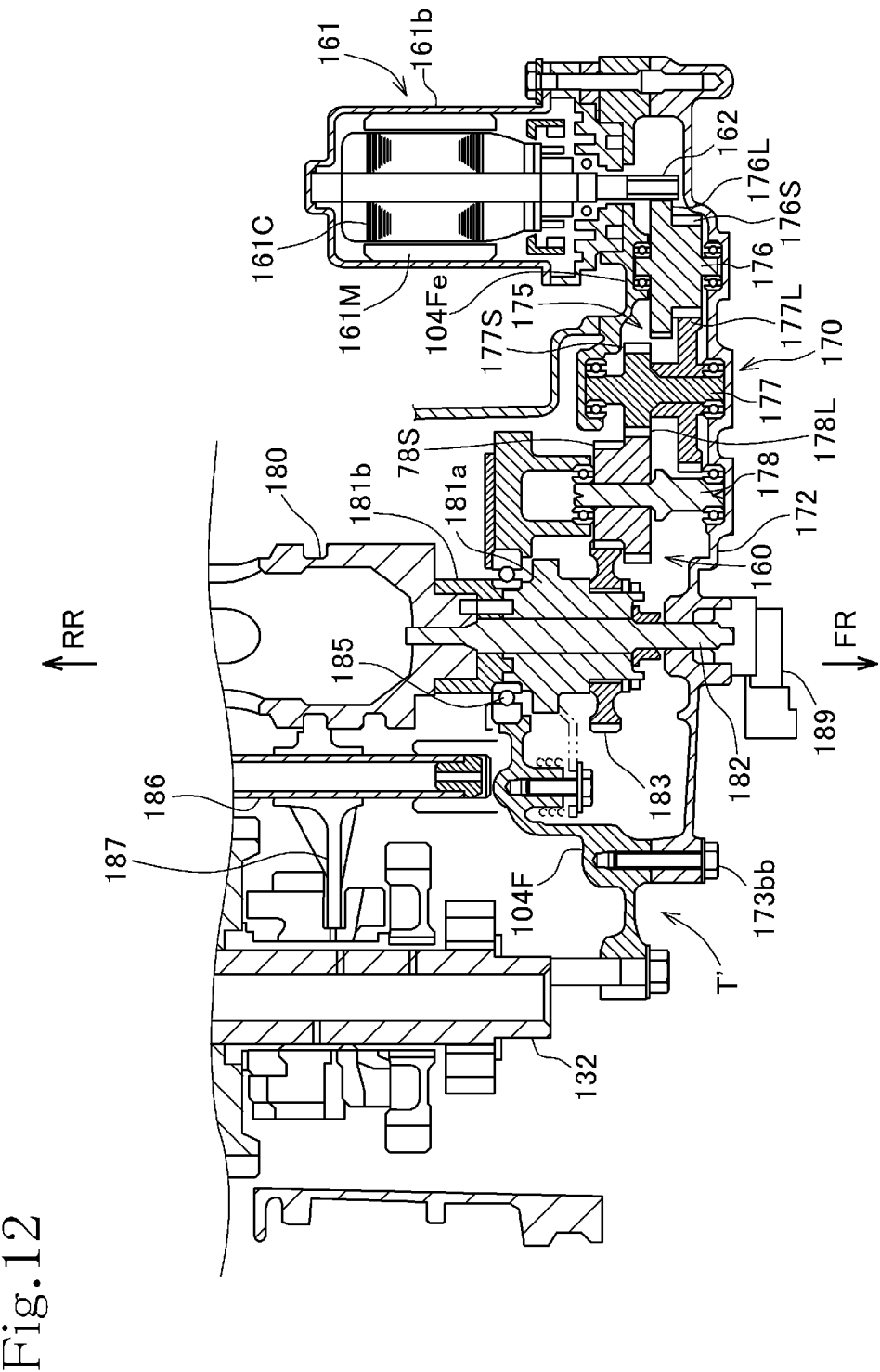
FIG. 12 is a developed sectional view of the major components of the vehicle power unit.

Reference is made to FIG. 12. A shaft extension boss member 181a is extended toward the front via an intervening member 181b at a front end portion of the shift drum 180. A drum rotary shaft member 182 passes through the shaft extension boss member 181a and the intervening member 181b.

A joint between the intervening member 181b and the shaft extension boss member 181a, which are mounted at the front end portion of the shift drum 180, is supported by the front-side case side wall 104F via a ball bearing 185.

A driven gear 183 is fitted on the shaft extension boss member 181a, which passes through the front-side case side wall 104F at the front end portion of the shift drum 180 to thereby extend toward the front.

The front-side case side wall 104F has a lower half portion that supports the shift drum 180. The lower half portion of the case side wall 104F extends toward the left to thereby form an extended support wall portion 104Fe.

A case frame wall portion 104S extends toward the front to cover an area around a space in front of the main shaft 131 and around the driven gear 183 on the front end portion of the shift drum 180. The case frame wall portion 104S is formed to extend around the leftwardly extending front-side case side wall 104F. The case frame wall portion 104S extends up to a circumferential edge of the extended support wall portion 104Fe, which is extended to the left.

A shift motor 161 is mounted, from the rear side, on the leftward part of the extended support wall portion 104Fe of the front-side case side wall 104F.

Thus, the shift motor 161 has a motor main body 161*b* protruding rearward from the extended support wall portion 104Fe. A drive gear 162 of the shift motor 161 protrudes to the front from the extended support wall portion 104Fe. The drive gear 162 is positioned within a frame of the case frame wall portion 104S.

The drive gear 162 of the shift motor 161 and the driven gear 183 at the front end portion of the shift drum 180 are both disposed inside the frame of the case frame wall portion 104S and along front surfaces of the extended support wall portion 104Fe and the front-side case side wall 104F.

Gears of a reduction gear train 175, which transmits power from the drive gear 162 to the driven gear 183, are supported by the front-side case side wall 104F and disposed in sequence in the left-to-right direction.

The reduction gear train 175 is disposed inside the case frame wall portion 104S, which extends anteriorly from the front-side case side wall 104F. The case frame wall portion 104S has a front side opening covered by a cover member 172 on the front side.

The cover member 172 is fastened to the case frame wall portion 104S by a plurality of bolts 173*bb*.

Reference is made to FIG. 12. The reduction gear train 175 has four reduction speeds. Three gear shafts of first, second, and third gear shafts 176, 177, and 178 are oriented in the fore-aft direction. The first, second, and third gear shafts 176, 177, and 178 are supported by having rear and front ends thereof supported by the front-side case side wall 104F (including the extended support wall portion 104Fe) and by the cover member 172.

The cover member 172 supports a front end portion of the drum rotary shaft member 182, which supports the driven gear 183. The driven gear 183 is provided in a protruding manner and secured to the shaft extension boss member 181*a* at the front end portion of the shift drum 180.

A drum rotational angle sensor 189 for detecting angular position of the shift drum 180 is disposed at the front end of the drum rotary shaft member 182, which passes through the cover member 172.

Reference is made to FIG. 11. The first gear shaft 176 is located at an obliquely downward position on the left of the drive gear 162 of the shift motor 161. The drive gear 162 is disposed at the leftmost end in the motorcycle and supported by the extended support wall portion 104Fe. The second gear shaft 177 is located at an obliquely downward position on the left of the first gear shaft 176. The third gear shaft 178 is located at an obliquely upward position on the left of the second gear shaft 177 and an obliquely upward position on the right of the driven gear 183.

In the reduction gear train 175, the first, second, and third gear shafts 176, 177, and 178 are arranged in sequence from the side of the drive gear 162 to the driven gear 183 on the right in a vertically zigzag manner.

An enlarged-diameter gear 176L and a reduced-diameter gear 176S are integrally formed with the first gear shaft 176. An enlarged-diameter gear 177L and a reduced-diameter gear 177S are integrally formed with the second gear shaft 177. An enlarged-diameter gear 178L and a reduced-diameter gear 178S are supported on the third gear shaft 178.

The drive gear 162, which has a small diameter and protrudes frontward from the front side surface of the extended support wall portion 104Fe (the front-side case side wall 104F), meshes with the enlarged-diameter gear 176L of the first gear shaft 176 to thereby provide a first reduction speed R1. The reduced-diameter gear 176S of the first gear shaft 176 meshes with the enlarged-diameter gear 177L of the second gear shaft 177 to thereby provided a second reduction speed R2. The reduced-diameter gear 177S of the second gear shaft 177 meshes with the enlarged-diameter gear 178L of the third gear shaft 178 to thereby provided a third reduction speed R3. The reduced-diameter gear 178S of the third gear shaft 178 meshes with the driven gear 183 to thereby provided a fourth reduction speed R4.

Specifically, the reduction gear train 175 has the four reduction speeds of the first, second, third, and fourth reduction speeds R1, R2, R3, and R4.

Thus, rotation of the drive gear 162 of the shift motor 161 is transmitted to the driven gear 183 through a speed reduction achieved by the four reduction speeds of the first, second, third, and fourth reduction speeds R1, R2, R3, and R4 of the reduction gear train 175, to thereby be transmitted to the shift drum 180 integrated with the driven gear 183.

The rotation of the shift drum 180 causes the shift forks 187 to be guided by a lead groove 80*v* formed in the outer peripheral surface of the shift drum 180 and to be moved in the axial directions, so that the shift speeds of the transmission 130 of the transmission apparatus T' are changed.

Reference is made to FIG. 12. The extended support wall portion 104Fe is provided so as to extend outward in the vehicle width direction in parallel with the front-side case side wall 104F of the crankcase 104, and the front-side case side wall 104F supports the drum rotary shaft member 182 on which the driven gear 183 is mounted. The gears of the reduction gear train 175, which has the four reduction speeds to transmit power from the drive gear 162 of the shift motor 161, mounted on the extended support wall portion 104Fe, to the driven gear 183, are arranged by being supported on the extended support wall portion 104Fe and on the front-side case side wall 104F. The speed change drive mechanism 160 is thus integrated on the front-side case side wall 104F on a first side of the speed change drive mechanism 160 and on the extended support wall portion 104Fe, so that the transmission apparatus T' can be prevented from becoming large in size and reduction in size of the vehicle power unit P' can be promoted.

The extended support wall portion 104Fe represents an integrated portion of the front-side case side wall 104F extended to the left. Thus, the drive gear 162 and the driven gear 183 are disposed on surfaces substantially flush with each other, and the speed change drive mechanism 160 is integrated on the front-side case side wall 104F on the first side. The transmission apparatus T' can thus be prevented from becoming large in size and reduction in size of the vehicle power unit P' can be promoted.

In the reduction gear train 175, the first, second, and third gear shafts 176, 177, and 178 are arranged in sequence from the side of the drive gear 162 to the driven gear 183 on the right in a vertically zigzag manner. This arrangement enables the first, second, and third gear shafts 176, 177, and 178 to be compactly arranged and the speed change drive mechanism 160 to be further integrated on the front-side case side wall 104F, so that the transmission apparatus T' can be prevented from becoming large in size.

In addition, driving power of the shift motor 161 is transmitted for rotation of the shift drum 180 via only the reduction gear train 175. This configuration eliminates the need for an intermittent feed mechanism, so that a simplified structure can be achieved by reducing the number of parts used in the speed change drive mechanism 160. Thus, the transmission apparatus T' can be prevented from becoming large in size and reduction in size and cost of the vehicle power unit P' can be further promoted. Furthermore, a quick and smooth gearshift operation can be performed through use of an electric motor.

The omission of the intermittent feed mechanism leads to gearshift noise being not generated by the intermittent feed mechanism, thus eliminating the need for a sound isolation structure.

The drive gear 162, the enlarged-diameter gear 176L, the reduced-diameter gear 176S, the enlarged-diameter gear 177L, the reduced-diameter gear 177S, the enlarged-diameter gear 178L, the reduced-diameter gear 178S, and the driven gear 183 in the reduction gear train 175 have numbers of gear teeth of 11, 72, 23, 38, 21, 31, 25, and 46, respectively.

Thus, in the reduction gear train 175, the first reduction speed R1 has a reduction gear ratio of approximately 6.5 (=72/11), the second reduction speed R2 has a reduction gear ratio of approximately 1.7 (=38/23), the third reduction speed R3 has a reduction gear ratio of approximately 1.5 (=31/21), and the fourth reduction speed R4 has a reduction gear ratio of approximately 1.8 (=46/25). The reduction gear train 175 is set to have an overall reduction gear ratio of approximately 29.4.

The shift motor 161 is a permanent magnet field DC commutator motor. The shift motor 161 includes ten coils 161C disposed in a circumferential direction on the side of a rotor and a permanent magnet 161M having ten pole pieces disposed in a circumferential direction of a stator on the outer peripheral side of the rotor.

The shift motor 161 develops cogging torque of a maximum of approximately 0.052 Nm generated through action by a magnetic force of the permanent magnet 161M on a coil iron core when no current flows therethrough.

Changes in the cogging torque acting on the shift drum 180 with respect to rotational angle of the shift drum 180 when, in the speed change drive mechanism 160 as described above, the shift drum 180 is rotated by drive of the shift motor 161 through the reduction gear train 175, which has a reduction gear ratio of approximately 29.4, are substantially identical to what is depicted in FIG. 7.

The cogging torque Tc has a maximum value of approximately 1.53 Nm that is greater than approximately 1.15 Nm as the maximum value of the stopper torque $T_{st}$.

Thus, the speed change drive mechanism 160 including the shift motor 161 and the reduction gear train 175 achieves the positioning function achieved by the stopper mechanism because of the cogging torque Tc acting on the shift drum 180, so that the stopper mechanism can be omitted.

Additionally, the speed change drive mechanism 160 also omits the intermittent feed mechanism that has hitherto been required. Even without the use of the intermittent feed mechanism, the reduction gear train 175 is effectively used for braking the shift motor 161 through the cogging torque, to thereby reduce an overshoot of the shift drum 180, so that the shift drum 180 can be brought to a stop accurately at a target angle.

As such, the speed change drive mechanism 160, having the reduction gear ratio of approximately 29.4 by the reduction gear train 175, can easily bring the shift drum 180 to a stop at required angular positions even without the use of the intermittent feed mechanism and the stopper mechanism. The number of parts used in the speed change drive mechanism 160 can thus be reduced, so that the structure can be simplified and cost reduction can be achieved.

When the reduction gear ratio of the reduction gear train falls below 23, the cogging torque Tc acting on the shift drum has a maximum value smaller than approximately 1.15 Nm as the maximum value of the stopper torque $T_{st}$, so that omission of the stopper mechanism is difficult.

While the present invention has been particularly described with reference to the vehicle power units P and P' according to the two specific embodiments, it will be understood that the embodiments are not intended to limit the present invention and various changes in form and detail may be made therein without departing from the spirit and scope of the invention.

REFERENCE SIGNS LIST

P . . . Vehicle power unit, E . . . Internal combustion engine, T . . . Transmission apparatus, Tm . . . Main transmission, Ts . . . Subsidiary transmission, 1 . . . All-terrain vehicle, 2 . . . Front wheel, 3 . . . Rear wheel, 5 . . . Vehicle body frame, 6 . . . Front drive shaft, 7 . . . Front differential apparatus, 8 . . . Rear drive shaft, 9 . . . Rear differential apparatus, 10 . . . , 11 . . . Front seat, 12 . . . Rear seat, 13, 14 . . . Steering column, 15 . . . Steering wheel, 16 . . . Roof, 20 . . . Power transmission apparatus, 21 . . . Crankshaft, 22 . . . Crankcase, 22f . . . Front-side case side wall, 22r . . . Rear-side case side wall, 22t . . . Main transmission case, 23 . . . Cylinder block, 24 . . . Cylinder head, 25 . . . Cylinder head cover, 26 . . . Piston, 27 . . . Connecting rod, 28 . . . Primary drive gear, 29 . . . Primary driven gear, 30 . . . Twin clutch, 30C . . . Clutch cover, 31 . . . Transmission, 32 . . . Main shaft, 32g . . . Drive speed change gear, 33 . . . Counter shaft, 33g . . . Driven speed change gear, 35 . . . Coupling torque damper, 40f . . . Front side subsidiary transmission case, 40r . . . Rear side subsidiary transmission case, 41 . . . Transmission drive shaft, 43 . . . High-speed drive gear, 44 . . . Low-speed drive gear, 45 . . . Reverse drive gear, 50 . . . , 51 . . . Transmission driven shaft (output shaft), 52, 53 . . . High-speed driven gear, 54 . . . Low-speed driven gear, 55 . . . Intermediate gear shaft, 56 . . . Enlarged-diameter intermediate gear, 57 . . . Reduced-diameter intermediate gear, 58, 59, 60 . . . Speed change drive mechanism, 61 . . . Shift motor, 61b . . . Motor main body, 62 . . . Drive gear, 70 . . . Reduction gear mechanism, 71 . . . Extended support wall, 71$_C$ . . . Vertical wall portion, 71$_F$ . . . Circularly annular frame wall portion, 71$_R$ . . . Annular frame wall portion, 72 . . . Cover member, 73ba, 73bb . . . Bolt, 75 . . . Reduction gear train, 76 . . . First gear shaft, 76L . . . Enlarged-diameter gear, 76S . . . Reduced-diameter gear, 77 . . . Second gear shaft, 77L . . . Enlarged-diameter gear, 77S . . . Reduced-diameter gear, 78 . . . Third gear shaft, 78L . . . Enlarged-diameter gear, 80 . . . Shift drum, 81 . . . Drum rotary shaft member, 82 . . . Bolt, 83 . . . Driven gear, 84 . . . Needle bearing, 85 . . . Ball bearing, 86 . . . Shift fork shaft, 87 . . . Shift fork, 89 . . . Drum rotational angle sensor, 90 . . . Stopper mechanism, 91 . . . Star-shaped cam, 92 . . . Stopper arm, 93 . . . Stopper roller, P' . . . Vehicle power unit, E' . . . Internal combustion engine, T' . . . Transmission apparatus, 102 . . . Engine block, 104 . . . Crankcase, 104F . . . Front-side case side wall, 104Fe . . . Extended support wall portion, 104S . . . Case frame wall portion, 105 . . . Cylinder head, 106 . . . Cylinder head cover, 107 . . . Crankshaft, 108 . . . Front cover, 130 . . . Transmission, 131 . . . Main shaft, 132 . . . Counter shaft, 160 . . . Speed change drive mechanism, 161 . . . Shift motor, 161b . . . Motor main body, 162 . . . Drive gear, 170 . . . Reduction gear mechanism, 172 . . . Cover member, 175 . . . Reduction gear train, 176 . . . First gear shaft, 176L . . . Enlarged-diameter gear, 176S . . . Reduced-diameter gear, 177 . . . Second gear shaft, 177L . . . Enlarged-diameter gear, 177S . . . Reduced-diameter gear, 180 . . . Shift drum, 181a . . . Shaft extension boss member, 181b . . . Intervening member, 182 . . . Drum rotary shaft member, 183 . . . Driven gear, 185 . . . Ball bearing, 186 . . . Shift fork shaft, 187 . . . Shift fork, 189 . . . Drum rotational angle sensor

The invention claimed is:

1. A vehicle power unit mounted on a small-sized vehicle, including an internal combustion engine with a crankshaft oriented in a vehicle fore-aft direction, and a transmission apparatus, which are integrally housed in a crankcase, wherein:

the transmission apparatus comprises:
a transmission including gear pairs having specific gear ratios for power transmission, respectively, and
a speed change drive mechanism for performing a gearshift operation by changing the gear pairs for power transmission by the transmission through movement of a shift fork guided by a shift drum rotatable by means of a shift motor;

the shift drum extends in the vehicle fore-aft direction and includes first and second drum rotary shaft portions provided at one and other ends of the shift drum;

first and second case side walls are provided at one and other sides of the crankcase to rotatably support the first and second drum rotary shaft portions, respectively;

a driven gear is mounted on the first drum rotary shaft portion on the one end of the shift drum;

an extended support wall is formed so as to extend outward in a vehicle width direction from, and in parallel with the first case side wall of the crankcase;

the shift motor is supported on the extended support wall and has a drive gear rotatably supported by the extended support wall; and gears of a reduction gear train are provided between the drive gear and the driven gear and have a plurality of reduction speeds for power transmission from the drive gear to the driven gear, the gears of the reduction gear train being arranged on the extended support wall and the first case side wall.

2. The vehicle power unit according to claim 1, wherein:
the shift motor is a direct current motor having a maximum value of pulsating cogging torque of 0.04 to 0.07 Nm; and
the reduction gear train has a reduction gear ratio from 23 to 45.

3. The vehicle power unit according to claim 1, wherein:
the driven gear on the one end of the shift drum is positioned on an outer side of the first case side wall; and
the shift motor is mounted on the extended support wall in such a manner that the drive gear is positioned on a side of the extended support wall, which is the same side as said outer side of the first case side wall.

4. The vehicle power unit according to claim 3, wherein:
with respect to the fore-aft direction, the extended support wall is displaced toward said outer side on which the driven gear is positioned relative to the first case side wall;
the reduction gear train has an intermediate gear shaft oriented in the fore-aft direction, the intermediate gear shaft being disposed to extend from the first case side wall to a position beyond the extended support wall;
the reduction gear train includes a drive-side reduction gear train provided between the drive gear and an enlarged-diameter reduction gear fitted on the intermediate gear shaft adjacent to the extended support wall; and
the reduction gear train includes a driven-side reduction gear train provided between the driven gear and a reduced-diameter reduction gear fitted on the intermediate gear shaft adjacent to the first case side wall.

5. The vehicle power unit according to claim 4, wherein:
the drive-side reduction gear train has reduction speeds greater in number than the driven-side reduction gear train.

6. The vehicle power unit according to claim 4, wherein:
the shift motor is disposed such that it has a motor main body oriented in a vehicle frontward direction and the drive gear thereof is positioned rearward of the motor main body.

7. The vehicle power unit according to claim 4, wherein:
the intermediate gear shaft is a manual gearshift operation shaft.

8. The vehicle power unit according to claim 7, wherein:
the intermediate gear shaft has an end portion on a side adjacent to the extended support wall, the end portion being a gearshift acting knob to which a manual gearshift operating force is applied.

9. The vehicle power unit according to claim 3, wherein:
the extended support wall is an extended support wall portion formed integrally with the first case side wall and extending outward in the vehicle width direction.

10. The vehicle power unit according to claim 9, wherein:
the reduction gear train includes gear shafts arranged in the vehicle width direction in a vertically zigzag manner.

* * * * *